United States Patent
Candelore et al.

(10) Patent No.: US 8,453,172 B2
(45) Date of Patent: *May 28, 2013

(54) CONTENT REPLACEMENT BY PID MAPPING

(75) Inventors: Brant L. Candelore, Escondido, CA (US); Leo M. Pedlow, Jr., Ramona, CA (US); Jon D. Garrett, Solana Beach, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 351 days.

This patent is subject to a terminal disclaimer.

(21) Appl. No.: 12/877,240

(22) Filed: Sep. 8, 2010

(65) Prior Publication Data

US 2011/0035769 A1 Feb. 10, 2011

Related U.S. Application Data

(63) Continuation of application No. 12/283,377, filed on Sep. 11, 2008, now Pat. No. 7,882,517, which is a continuation of application No. 10/319,066, filed on (Continued)

(51) Int. Cl.
*H04N 7/025* (2006.01)
*H04N 7/10* (2006.01)

(52) U.S. Cl.
USPC .................................. 725/32; 725/34; 725/36

(58) Field of Classification Search
USPC ................................................ 725/32, 34, 36
See application file for complete search history.

(56) References Cited

U.S. PATENT DOCUMENTS 5,926,624 A 7/1999 Katz et al.
5,933,498 A 8/1999 Schneck et al.
(Continued)

FOREIGN PATENT DOCUMENTS

JP 09-251714 9/1997
JP 2000-125260 4/2000
(Continued)

OTHER PUBLICATIONS

Bungum, O.W., "Transmultiplexing, Transcontrol and Transscrambling of MPEG-2/DVB Signal," International Broadcasting Convention, Conference Publication No. 428, pp. 288-293, Sep. 1996.

(Continued)

*Primary Examiner* — Pankaj Kumar
*Assistant Examiner* — Mulugeta Mengesha
(74) *Attorney, Agent, or Firm* — Miller Patent Services; Jerry A. Miller

(57) ABSTRACT

A method of content substitution involves receiving an ordered stream of packets containing content marked by a first packet identifier (PID) and one or more substitute content portions marked by one or more secondary PIDs, where the number and placement of packets marked by secondary PIDs ahead of packets marked by the first PID in the stream is retained during transmission of the ordered stream of packets; the ordered stream of packets have an odd or even number of packets with the PIDs after a packet with a first PID; initiating processing for display or storage of content contained in packets having the first PID; initiating processing for display or storage of content contained in packets having a selected secondary PID that meets a substitution criterion; and either deleting or processing the content having the first PID depending upon a number of received intervening packets having secondary PIDs that reside between the packets having the first PID and the packets having the selected secondary PID that meets the substitution criterion, where deleting or processing is determined by whether the number of packets is an odd or an even number. This abstract is not to be considered limiting, since other embodiments may deviate from the features described in this abstract.

27 Claims, 11 Drawing Sheets

Related U.S. Application Data

Dec. 13, 2002, now Pat. No. 7,765,567, which is a continuation-in-part of application No. 10/038,217, filed on Jan. 2, 2002, now Pat. No. 7,336,787, and a continuation-in-part of application No. 10/038,032, filed on Jan. 2, 2002, now Pat. No. 7,139,398, and a continuation-in-part of application No. 10/037,914, filed on Jan. 2, 2002, now Pat. No. 7,124,303, and a continuation-in-part of application No. 10/037,499, filed on Jan. 2, 2002, now Pat. No. 7,151,831, and a continuation-in-part of application No. 10/037,498, filed on Jan. 2, 2002, now Pat. No. 7,127,619, and a continuation-in-part of application No. 10/273,905, filed on Oct. 18, 2002, now Pat. No. 7,376,233, and a continuation-in-part of application No. 10/273,903, filed on Oct. 18, 2002, now Pat. No. 7,302,059, and a continuation-in-part of application No. 10/274,084, filed on Oct. 18, 2002, now Pat. No. 7,155,012, and a continuation-in-part of application No. 10/274,019, filed on Oct. 18, 2002, now Pat. No. 7,292,690.

(60) Provisional application No. 60/409,675, filed on Sep. 9, 2002.

(56) References Cited

U.S. PATENT DOCUMENTS

| | | | |
|---|---|---|---|
| 5,968,197 A * | 10/1999 | Doiron | 714/748 |
| 6,148,205 A | 11/2000 | Cotton | |
| 6,314,188 B1 | 11/2001 | Ishibashi | |
| 6,463,445 B1 | 10/2002 | Suzuki et al. | |
| 6,615,039 B1 * | 9/2003 | Eldering | 455/418 |
| 6,718,551 B1 * | 4/2004 | Swix et al. | 725/32 |
| 6,735,311 B1 | 5/2004 | Rump et al. | |
| 6,738,394 B1 * | 5/2004 | Kreuzgruber et al. | 370/514 |
| 6,820,277 B1 * | 11/2004 | Eldering et al. | 725/35 |
| 6,922,785 B1 | 7/2005 | Brewer et al. | |
| 6,973,187 B2 | 12/2005 | Gligor et al. | |
| 7,100,183 B2 * | 8/2006 | Kunkel et al. | 725/34 |
| 7,194,192 B2 | 3/2007 | Ko et al. | |
| 7,490,344 B2 * | 2/2009 | Haberman et al. | 725/98 |
| 7,500,258 B1 * | 3/2009 | Eldering | 725/32 |
| 7,720,432 B1 | 5/2010 | Colby et al. | |
| 7,984,466 B2 * | 7/2011 | Eldering et al. | 725/34 |
| 2001/0017885 A1 | 8/2001 | Asai et al. | |
| 2002/0056093 A1 * | 5/2002 | Kunkel et al. | 725/35 |
| 2002/0083439 A1 | 6/2002 | Eldering | |
| 2002/0196850 A1 * | 12/2002 | Liu et al. | 375/240.12 |
| 2003/0026432 A1 | 2/2003 | Woodward | |
| 2003/0079133 A1 | 4/2003 | Breiter et al. | |
| 2004/0003281 A1 | 1/2004 | Sonoda et al. | |
| 2004/0078338 A1 | 4/2004 | Ohta et al. | |
| 2004/0088558 A1 | 5/2004 | Candelore et al. | |
| 2005/0172127 A1 | 8/2005 | Hartung et al. | |
| 2005/0210502 A1 * | 9/2005 | Flickinger et al. | 725/34 |
| 2005/0228752 A1 | 10/2005 | Konetski et al. | |
| 2005/0271205 A1 | 12/2005 | Shen et al. | |
| 2006/0036554 A1 | 2/2006 | Schrock et al. | |
| 2006/0168616 A1 * | 7/2006 | Candelore | 725/34 |
| 2007/0100701 A1 | 5/2007 | Boccon-Gibod et al. | |
| 2009/0210698 A1 | 8/2009 | Candelore | |

FOREIGN PATENT DOCUMENTS

| | | |
|---|---|---|
| JP | 2001-117809 | 4/2001 |
| JP | 2001-242786 | 9/2001 |
| JP | 2003-122710 | 4/2003 |
| KR | 2001-0093609 | 10/2001 |

OTHER PUBLICATIONS

Parviainen, Roland and Parnes, Peter, "Large Scale Distributed Watermarking of Multicast Media Through Encryption," 2001.

* cited by examiner

CONTENT REPLACEMENT BY PID MAPPING

CROSS REFERENCE TO RELATED DOCUMENTS

This application is a continuation of U.S. patent application Ser. No. 12/283,377 filed Sep. 11, 2008 now U.S. Pat. No. 7,882,517, which is a continuation of Ser. No. 10/319,066 filed Dec. 13, 2002 now U.S. Pat. No. 7,765,567 which is a continuation-in-part of patent applications entitled "Critical Packet Partial Encryption" to Unger et al., Ser. No. 10/038,217 now U.S. Pat. No. 7,336,787; patent applications entitled "Time Division Partial Encryption" to Candelore et al., Ser. No. 10/038,032 now U.S. Pat. No. 7,139,398; entitled "Elementary Stream Partial Encryption" to Candelore, Ser. No. 10/037,914 now U.S. Pat. No. 7,124,303; entitled "Partial Encryption and PID Mapping" to Unger et al., Ser. No. 10/037,499 now U.S. Pat. No. 7,151,831; and entitled "Decoding and Decrypting of Partially Encrypted Information" to Unger et al., Ser. No. 10/037,498 now U.S. Pat. No. 7,127,619 all of which were filed on Jan. 2, 2002; and which is also related to and claims priority benefit of U.S. Provisional patent application Ser. No. 60/409,675, filed Sep. 9, 2002, entitled "Generic PID Remapping for Content Replacement", to Candelore; and this application is also related to and is a continuation-in-part of U.S. patent application Ser. No. 10/273,905, filed Oct. 18, 2002 now U.S. Pat No. 7,376,233 to Candelore et al., entitled "Video Slice and Active Region Based Dual Partial Encryption"; Ser. No. 10/273,903, filed Oct. 18, 2002 now U.S. Pat. No. 7,302,059 to Candelore et al., entitled "Star Pattern Partial Encryption"; Ser. No. 10/274,084, filed Oct. 18, 2002 now U.S. Pat. No. 7,155,012 to Candelore et al., entitled "Slice Mask and Moat Pattern Partial Encryption", Ser. No. 10/274,019, filed Oct. 18, 2002 now U.S. Pat. No. 7,292,690 to Candelore et al., entitled "Video Scene Change Detection", which are hereby incorporated by reference. Each of the above documents is hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

This invention relates generally to the field of video on digital video. More particularly, this invention relates to a method and apparatus for providing selective replacement of digital video content.

BACKGROUND OF THE INVENTION

Conventional digital video content, such as MPEG video, can take the form of a single program, movie or other content with no opportunity for a service provider or a user to modify the viewing experience by selecting alternative content. Various mechanisms have been proposed for providing interactive content, but usually such proposals have been expensive to implement, can take up large amounts of bandwidth, and may require expensive specialized equipment including servers and/or other support equipment. Therefore, although there is a demand for "interactive" applications which allow an end viewer of video content to tailor what they watch and manipulate the content, no commercially viable system has yet appeared in the marketplace.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

Figure 1:
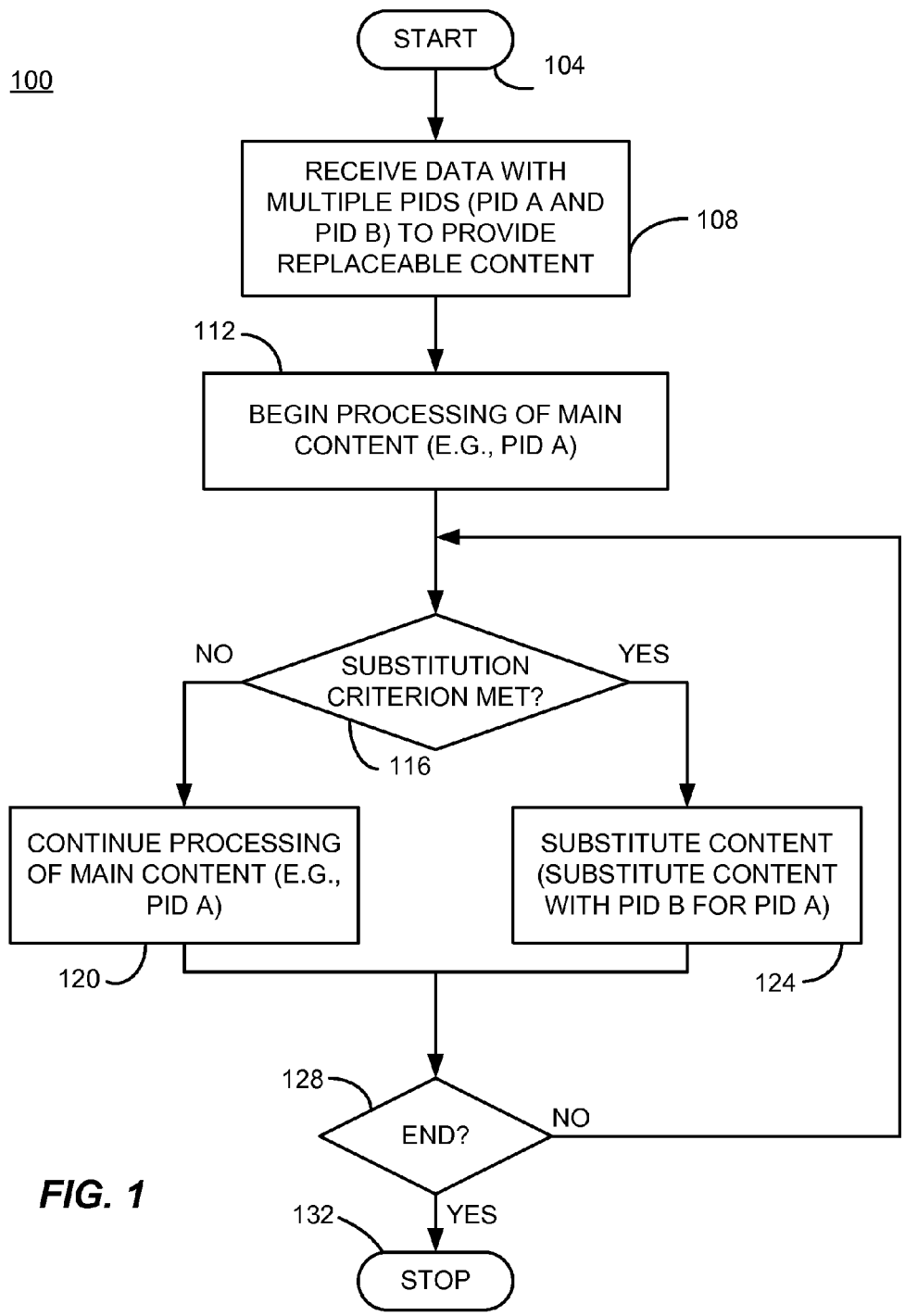
FIG. 1 is flow chart depicting a process for content substitution consistent with certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

The terms "scramble" and "encrypt" and variations thereof are used synonymously herein. The term "video" may be used herein to embrace not only true visual information, but also in the conversational sense (e.g., "video tape recorder") to embrace not only video signals but also associated audio and data. The present document generally uses the example of a "dual selective encryption" embodiment, but those skilled in the art will recognize that the present invention can be utilized to realize multiple partial encryption without departing from the invention. The terms "partial encryption" and "selective encryption" are used synonymously herein. Also, the terms "program" and "television program" and similar terms can be interpreted in the normal conversational sense, as well as a meaning wherein the term means any segment of A/V content that can be displayed on a television set or similar monitor device. The term "legacy" as used herein refers to existing technology used for existing cable and satellite systems. The exemplary embodiments disclosed herein are decoded by a television Set-Top Box (STB), but it is contemplated that such technology will soon be incorporated within television receivers of all types whether housed in a separate enclosure alone or in conjunction with recording and/or playback equipment or Conditional Access (CA) decryption module or within a television set itself. The present document generally uses the example of a "dual partial encryption" embodiment, but those skilled in the art will recognize that the present invention can be utilized to realize multiple partial encryption without departing from the invention. The term "package medium" and similar terms as used herein are intended to embrace a recording medium such as a Digital Versatile Disc (DVD), Compact Disc (CD) or other magnetic, optical or other recorded medium that is generally merchandised as a package that contains the electronic storage medium and is sold as a retail commodity, as contrasted to an electronically downloadable data stream.

The above-referenced commonly owned patent applications describe inventions relating to various aspects of methods generally referred to herein as partial encryption or selective encryption. More particularly, systems are described wherein selected portions of a particular selection of digital content are encrypted using two (or more) encryption techniques while other portions of the content are left unencrypted. The encrypted portions are identified and distinguished from one another by use of multiple packet identifiers. By properly selecting the portions to be encrypted, the content can effectively be encrypted for use under multiple decryption systems without the necessity of encryption of the entire selection of content. In some embodiments, only a few percent of data overhead is needed to effectively encrypt the content using multiple encryption systems. This results in a cable or satellite system being able to utilize Set-top boxes or other implementations of conditional access (CA) receivers from multiple manufacturers in a single system—thus freeing the cable or satellite company to competitively shop for providers of Set-top boxes.

The partial encryption processes described in the above patent applications utilize any suitable encryption method. However, these encryption techniques are selectively applied to the data stream, rather than encrypting the entire data stream, using techniques described in the above-referenced patent applications. In general, but without the intent to be limiting, the selective encryption process utilizes intelligent selection of information to encrypt so that the entire program does not have to undergo dual encryption. By appropriate selection of data to encrypt, the program material can be effectively scrambled and hidden from those who desire to hack into the system and illegally recover commercial content without paying. MPEG (or similar format) data that are used to represent the audio and video data does so using a high degree of reliance on the redundancy of information from frame to frame. Certain data can be transmitted as "anchor" data representing chrominance and luminance data. That data is then often simply moved about the screen to generate subsequent frames by sending motion vectors that describe the movement of the block. Changes in the chrominance and luminance data are also encoded as changes rather than a recoding of absolute anchor data. Thus, encryption of this anchor data, for example, or other key data can effectively render the video un-viewable.

In accordance with certain embodiments consistent with the above inventions, the selected video data to be encrypted may be any individual one or combination of the following (described in greater detail in the above applications): video slice headers appearing in an active region of a video frame, data representing an active region of a video frame, data in a star pattern within the video frame, data representing scene changes, I Frame packets, packets containing motion vectors in a first P frame following an I Frame, packets having an intra_slice_flag indicator set, packets having an intra_slice indicator set, packets containing an intra_coded macroblock, data for a slice containing an intra_coded macroblock, data from a first macroblock following the video slice header, packets containing video slice headers, anchor data, and P Frame data for progressively refreshed video data, data arranged in vertical and or horizontal moat patterns on the video frame, and any other selected data that renders the video and/or audio difficult to utilize. Several such techniques as well as others are disclosed in the above-referenced patent applications, any of which (or other techniques) can be utilized with the present invention to encrypt only a portion of the content.

In order to distinguish between the two or more digital television signals encrypted using the multiple encryption algorithms in accordance with the above inventions, multiple packet identifiers (PIDs) are utilized. Normally a single set of packet identifiers is used to identify a particular television program. When a television signal is encrypted under the multiple selective encryption arrangement described in the above-referenced applications, the clear content is assigned a first set of PIDs, and each set of encrypted content is assigned another set of PIDs (one set of encrypted content may share the same PID with the unencrypted content in certain embodiments). The receiving STB then remaps all of the appropriate content to a single PID for playback. This process is described in detail in the above patent applications.

The present invention utilizes multiple PIDs associated with a single item of content as a mechanism to provide content substitution. Content substitution can be used to provide an enhanced level of customization of television programming in any number of ways. For example, content substitution can be used to provide targeted advertising to an audience by substitution of one advertisement for another. Content substitution can also be used to provide multiple endings, plots or other segments for a program, or to provide multiple views in a sportscast or other program. Other applications for the content substitution of the present invention will be discussed during the course of this discussion. Each of these applications, as well as others, can be facilitated using the present invention without need for dramatic increases in bandwidth and at reasonable cost for the hardware.

Referring now to FIG. 1, an overall content substitution process 100 consistent with certain embodiments of the present invention is shown starting at 104. The content is received at 108 having portions identified by multiple PIDs (e.g., PID A and PID B in this example), which represent multiple possibilities for the content (e.g., multiple advertisements, logos, plots, endings, characters, etc.). This content could be received as a stream of content (as in a cable or satellite television transmission) or could be present in packaged media or a downloaded file. In any case, at 112 a processing operation (such as playback or transmission of the content) is initiated, generally using a main portion of the content designated with a particular packet identifier (e.g., PID A). At 116, the content is examined to determine if a prescribed substitution criterion has been met. Such criterion might be, for example, presence of a national advertisement, watermark or logo that a local content distributor wishes to replace with a local or regional advertisement, watermark or logo; or such criterion might entail selection by an end user of a particular plot, character or ending.

If the criterion is not met at 116, the processing of the main content (PID A) continues at 120. If the criterion is met at 116, a content substitution is carried out at 124 (e.g., by substitution of content with PID B for content with PID A, or by carrying out any of the other content substitution operations described herein including, but not limited to one-for-one substitution, one-for-one insertion or multiple-for-one insertion/deletion). Such substitution may entail a remapping of the PID values so that a decoder or other processor merely continues processing content with the same PID. Alternately, a decoder can be programmed to select the substituted content, when present, in preference to the main content. From 120 or 124, control passes to 128 where the content is examined to determine if the end has been reached. If not, control returns to processing content at 116. If the end is reached, the process stops at 132.

Thus, a method of content substitution consistent with certain embodiments of the present invention involve receiving data representing content, the data having at least first and second packet identifiers (PIDs) associated with first and second portions of content; playing content having the first PID; determining that a substitution criterion has been met; and substituting content having the second PID for content having the first PID.

In accordance with this process, for example, a local cable operator can receive a program that contains multiple sets of advertisements (commercials). Depending on the geographic location of the local operator, the main content can be retransmitted along with an appropriate one of several regional advertisements that are more appropriate to the geographic location or marketplace of the local cable operator. In another example, a movie with multiple selectable endings can be broadcast from a cable operator to its subscribers. The subscriber can then decide, before or during the viewing of the movie, which ending is preferred and make a selection. The subscriber sends a command to the STB which selects the alternative ending desired by the subscriber by selecting the ending associated with a particular PID and remapping that PID to the main program's PID. Numerous other examples will occur to those skilled in the art upon consideration of the present teachings.

Figure 2:
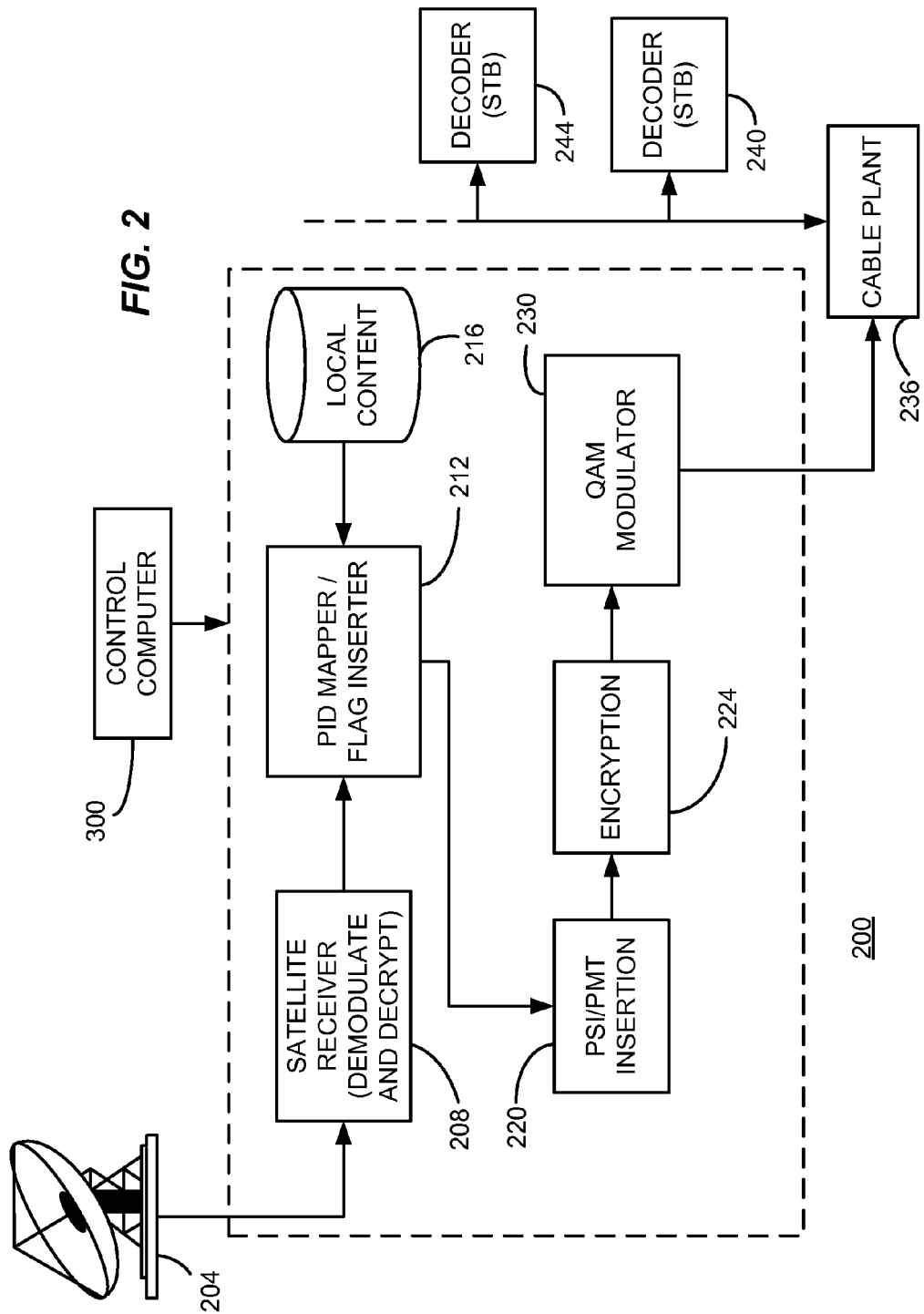
FIG. 2 is block diagram of a cable system consistent with certain embodiments of the present invention.

Referring now to FIG. 2, an exemplary cable system is depicted as 200. In this system, a satellite antenna 204 receives a multiplexed stream of content from a satellite transmission such as a HITS™ (Headend In The Sky) feed. The received stream of content is received, demodulated and decrypted at a satellite receiver 208 and the content that is to have substitutable information is passed along to a PID mapper and flag inserter 212, the function of which will become clear in view of discussions to follow. Additional content may be retrieved from a local content database 216 or other sources of content. Alternatively, the content with multiple PID encoded substitutable portions may be directly received from the satellite system. The PID mapper and flag inserter maps the incoming content from whatever source to a set of main PIDs for the main content and a set of secondary or shadow PIDs for the substitutable content at 212 in one embodiment. In another embodiment where the incoming data already has multiple PID encoded content, the PID mapper may be instructed to remap the PIDs to select only the desired content. Flags may be inserted into the content at 212 to identify a location where a substitution of content is to start and end.

The content then passes to a PSI/PMT inserter 220 that inserts Program Specific Information (PSI) and Program Map Tables (PMT) into the stream of content for use by the decoding side in decoding the programming. If the content is to be encrypted, it may be passed through an encrypter 224 prior to modulation at a modulator (such as a QAM modulator) 230. The modulated stream of content is then transmitted via the cable plant 236 to the end users with decoder boxes such as Set-top boxes 240 and 244. The operation of the cable head end, including but not limited to the PID mapping for content substitution, is carried out under control of a control computer 300.

Such a system can be used to form a content substitution encoder consistent with certain embodiments of the invention in which input data is received representing main content and representing substitution content. A packet identifier (PID) mapper assigns a primary PID to the main content and assigns a secondary PID to the substitution content. A private data generator generates user private data that identifies the main content by the primary PID and substitution content by the secondary PID. The private data, the main content mapped to the primary PID and the substitution content mapped to the secondary PID are then assembled into a data stream.

Figure 3:
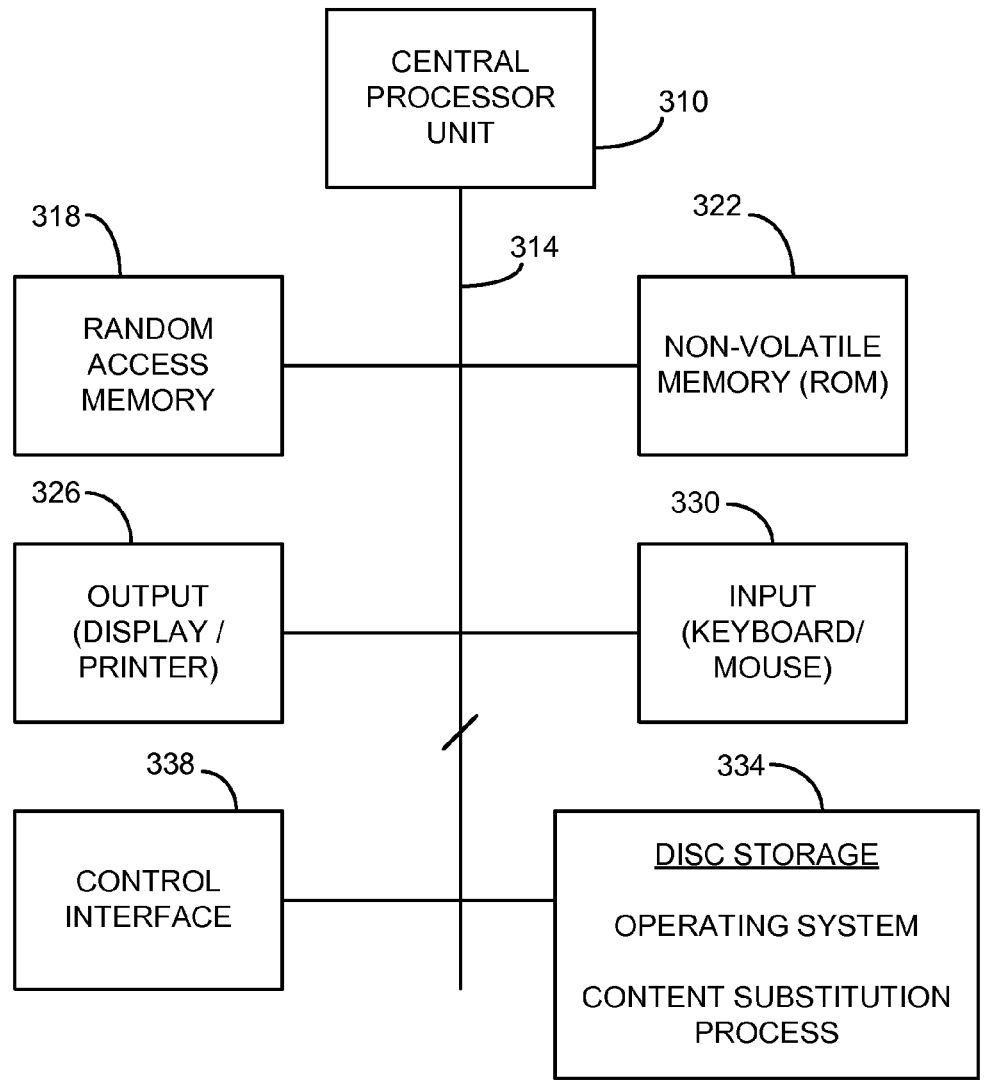
FIG. 3 is a block diagram of a control computer consistent with certain embodiments of the present invention.

The process 100 of FIG. 1 can be carried out on any suitable programmed general-purpose computer operating as control computer 300 of FIGS. 2-3. Computer 300 has one or more central processor units (CPU) 310 with one or more associated buses 314 used to connect the central processor unit 310 to Random Access Memory 318 and Non-Volatile Memory 322 in a known manner. Output devices 326, such as a display and printer, are provided in order to display and/or print output for the use of the MSO (multiple service operator) as well as to provide a user interface such as a Graphical User Interface (GUI). Similarly, input devices such as keyboard, mouse and removable media readers 330, may be provided for the input of information by the operator. Computer 300 also incorporates internal and/or external attached disc or other mass storage 334 (e.g., disc and/or optical storage) for storing large amounts of information including, but not limited to, the operating system, and the content substitution process program as well as content (which is most likely stored on massive attached storage such as local content database 216). The Computer system 300 also has an interface 338 for connection to the controlled devices in the cable system head end. While depicted as a single computer, the digital content provider may utilize multiple linked computers to carry out the functions described herein.

The description above largely assumes that the substitutable content is to be inserted at the cable system head end, but those skilled in the art will appreciate that the present content substitution concept can be implemented in many ways to permit content substitution at multiple levels to serve multiple purposes. For example, if the cable customer is viewing an interactive television show, the customer's selections (e.g., from a remote controller) can be used to establish the criterion for selection of a particular substitution (e.g., ending selection). However, the cable head end can also implement a content substitution in accord with certain embodiments consistent with the present invention, for example, by substitution of a local advertisement for a national advertisement or substitution of (or addition of) a local channel logo for a national logo.

Consider now an exemplary embodiment consistent with the present invention in which a content provider wishes to provide alternative advertisements to several groups of customers, for example in a cable television system. In this example, assume that the cable television customers can be divided into three categories based upon, for example, a customer profile stored at the cable system's head end. Now, with reference to FIG. 4, an exemplary television program 350 with three separate advertisements 354, 356 and 358 associated therewith is depicted. In order to segregate the three advertisements, three separate sets of PIDs are utilized (for simplicity, assume that there is one PID per advertisement). In the case of the main advertisement 354 directed to one viewing audience, the advertisement 354 can share the same PID (e.g., 100) with the program content.

The first alternative advertisement 356 is identified by an alternative PID (e.g., PID 101), and the second alternative advertisement is identified by another alternative PID (e.g., PID 102). Thus, in order to present the main advertisement, no special instructions need to be conveyed to the decoder (e.g., the television STB) since it is shared with the program content and will be shown by default. For decoders that are to decode the alternative advertisement 356, an instruction is sent from the cable system head end to the decoders instructing them to substitute content with PID 101 whenever this PID is encountered for PID 100. Similarly, for decoders that are to decode the alternative advertisement 358, an instruction is sent from the cable system head end to the decoders instructing them to substitute content with PID 102 whenever this PID is encountered in place of PID 100. In one embodiment, each packed of video data having PID 100 has a corresponding packet with PID 101 and PID 102. In other embodiments, a one for one correlation is not required. In any event, packet counts should be maintained in a manner that permits the proper ordered processing of packets at the decoder.

Figure 4:
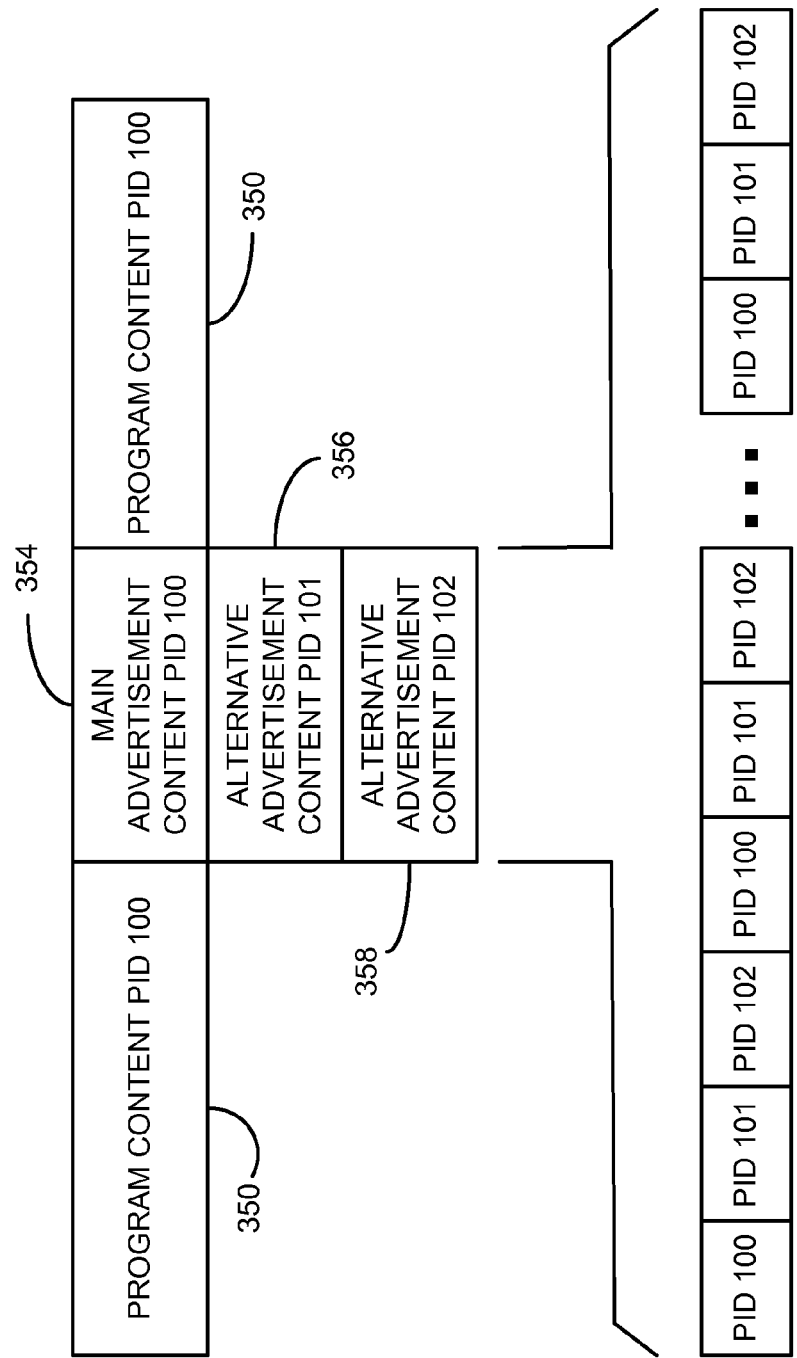
FIG. 4 illustrates a substitute advertisement consistent with certain embodiments of the present invention.

In this example, the content is displayed side by side to illustrate the direct substitution that is the nature of the process. However, as depicted in FIG. 4, the content may be arranged as a sequence of packets which systematically present the main content followed by the first alternative content and then the second alternative content and then the sequence repeats. In various embodiments, corresponding packets with primary and secondary PIDs may appear in order of primary followed by secondary or secondary followed by primary. Alternation of the packets avoids unnecessary delays in packet receipt and helps preserve the order of packets. Where a one for one correlation between primary and secondary packets exists, each of the primary and secondary packets may retain a packet number that is used to establish the order of presentation. Such numbering may be altered by the decoding process to retain order in the received content. Other embodiments are also possible without deviating from the present invention.

In addition to providing targeted advertisement for sets of customers by the cable system MSO, a similar technique can be implemented to provide networks with the ability to provide regional advertisement by embedding, for example, multiple regional advertisements into a single data stream and using a remapping of the PIDs at the local networks or cable operators to select the appropriate advertisement for a given region. Thus, the three advertisements depicted in FIG. 4 could equally well represent three regional advertisements such as one for the East coast of the U.S., one for the central portion of the U.S. and one for the West coast of the U.S., or any other suitable regional segregation with more or less alternative advertisements.

Figure 5:
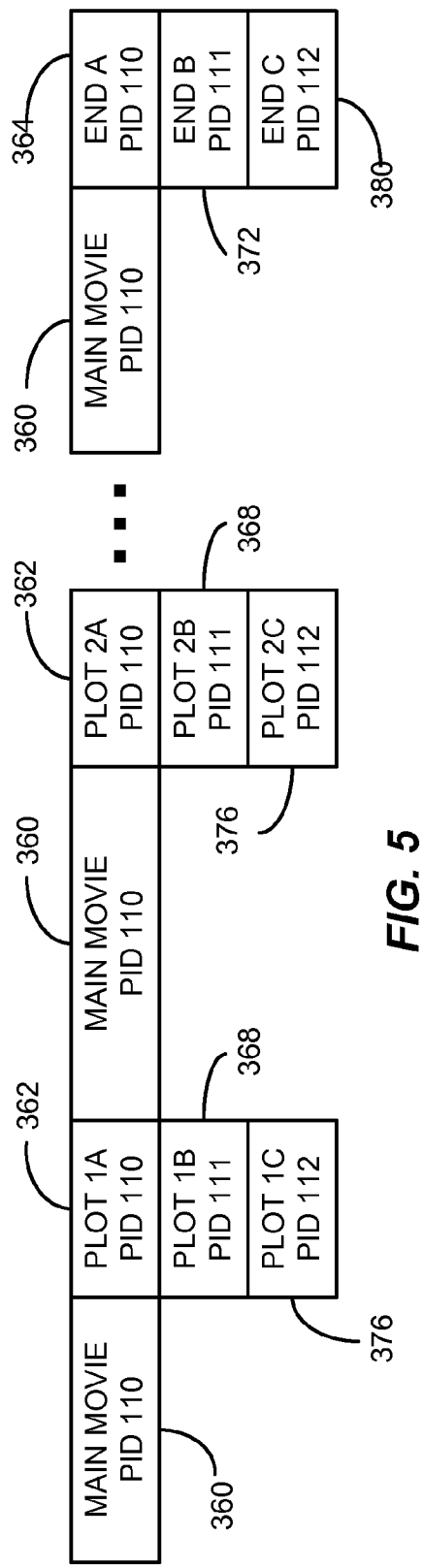
FIG. 5 illustrates a multiple plot, multiple ending movie consistent with certain embodiments of the present invention.

FIG. 5 depicts an exemplary embodiment where content substitution can be used to provide alternative plots and endings in a movie that is either stored as packaged medium content (e.g., a Digital Versatile Disc—DVD) or is streamed from a content provider such as a cable television MSO. In this embodiment, a main movie 360 is transmitted or stored using a main PID 110, for example. This movie can be played with three plots and three endings that may be selected, for example, by the viewer using a selection made either during the playback of the movie or as a periodic decision made during playback of the movie. The first plot A 362 uses the same PID 110 as the main portions of the movie as does the main ending A 364. When the customer selects plot A and ending A (individually or collectively) the decoder in the television STB selects PID 110 for the entire movie. Plot B 368, in a similar manner is associated with PID 111 as is ending B 372. Plot C 376 is similarly associated with PID 112, as is ending C 380. When the viewer selects plot B, and/or ending B, the STB decoder is instructed to substitute PID 111 for PID 100 so that alternative plot B and/or ending B is selected. Similarly, when the viewer selects plot C, and/or ending C, the STB decoder is instructed to substitute PID 112 for PID 100 so that alternative plot C and/or ending C is selected.

Figure 6:
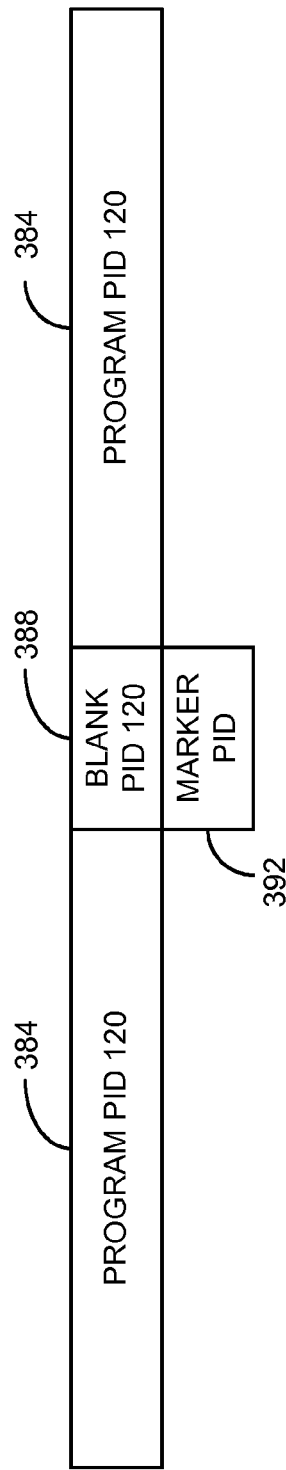
FIG. 6 illustrates a marker consistent with certain embodiments of the present invention.

With reference to FIG. 6, a program 384 using a particular PID, e.g., PID 120, contains a blank section 388 having PID 120 with an alternative portion of information serving as a marker PID 392.

Figure 7:
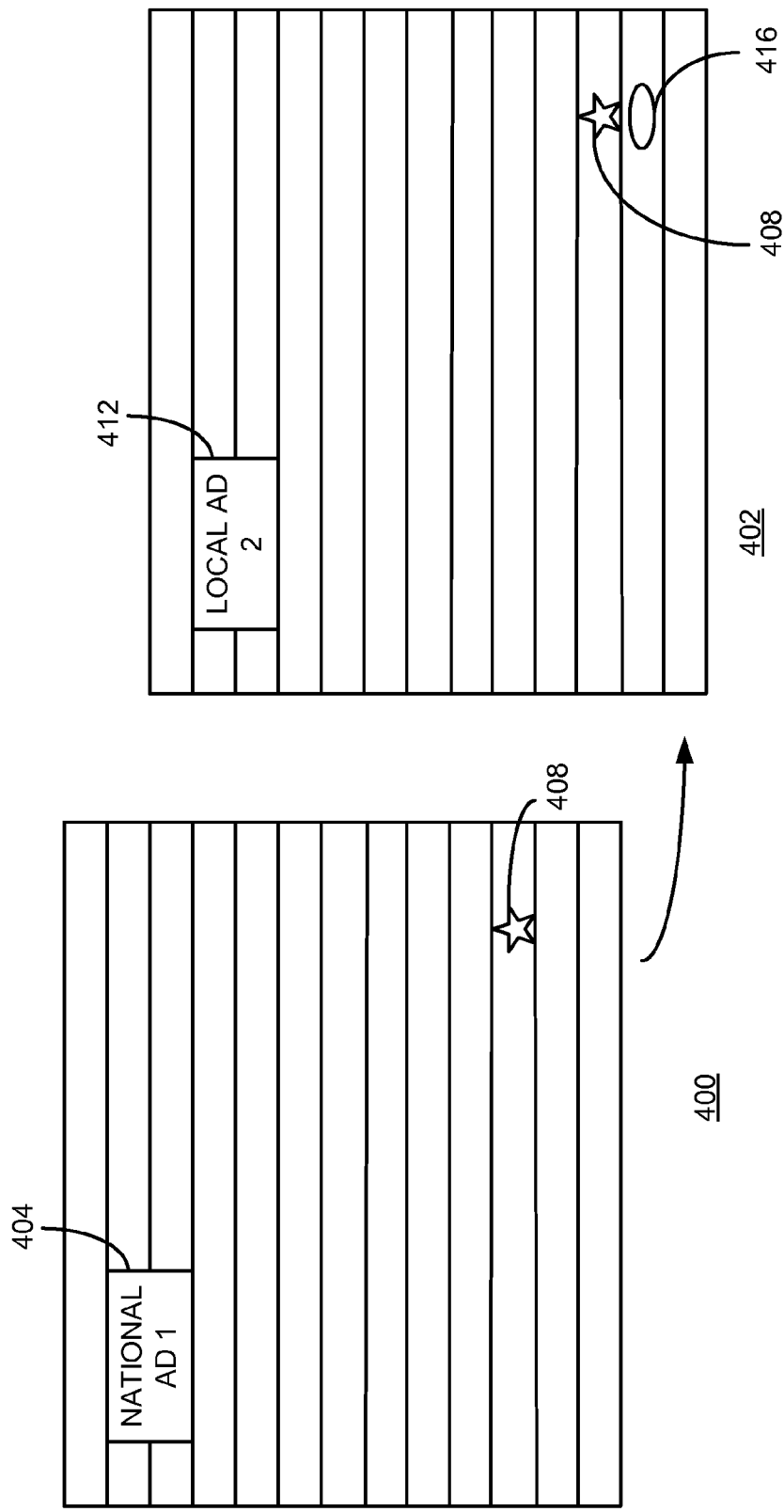
FIG. 7 illustrates substitution of a local banner advertisement and addition of a logo consistent with certain embodiments of the present invention.

The content substitution using alternative PIDs as described above can be utilized for any number of purposes. FIG. 7 depicts replacement of advertising banners and supplementation of logos or watermarks using the content substitution technique of the present invention. In this embodiment, a segment of main content is depicted as a television screen 400 divided into horizontal slices as such information would be encoded using MPEG digital coding. A first advertisement, e.g., a national advertisement, 404 is depicted as appearing in several sequential slices of the image near the upper left of the screen. A logo or watermark 408 appears in one slice near the bottom right of the image 400. Using content substitution, a new screen can be created. Packets containing the advertisement 404 can be replaced by packets containing a local or other alternative advertisement banner 412. Similarly, the watermark 408 could be replaced or supplemented by use of content substitution for certain packets within a slice of the video image. In this example, a network logo 408 might be supplemented by another logo (such as a local channel or other logo) 416 by substitution of packets bearing the supplemental logo.

These are but a few examples of the types of content manipulation that can be facilitated using the PID mapping techniques of the present invention. Several other examples are listed in the table below, but many more will occur to those skilled in the art upon consideration of the present discussion:

| Application | Primary PID | Substitute Content Secondary PID | Local | Replace (R), Insert (I) or Local (L) | Comment |
| --- | --- | --- | --- | --- | --- |
| Regular programming | Regular programming | | | | Main content sent on primary PID |

-continued

| Application | Primary PID | Substitute Content Secondary PID | Local | Replace (R), Insert (I) or Local (L) | Comment |
|---|---|---|---|---|---|
| Advertising | National Ad | Regional Ad | | R | |
| Banner Advertising | National Label | Regional Label | | R | Example banner around hockey rink |
| Logo | Main Logo | Local affiliate | | R or I | E.g., PBS and KPBS |
| Object Coding | E.g., character in movie | e.g., substitute character in movie | | R and I | MPEG 4 coding |
| Real Time Mark | Marker Packets | | Service ID unit address | R with L | Unit address info comes from content decoder |
| Movies with multiple plots and/or endings | Portion of movie that does not change | Different versions | | R and I | Movies may have different subplots and endings |
| Sportscasts with different views | Portion of sportscast that does not change | Different views of action | | R and I | e.g. a baseball game may be presented with multiple views of the action |
| New compression upgrade | Older compression components | New compression components | | R and I | E.g., MPEG 4 sent in MPEG 2 stream |

Figure 8:
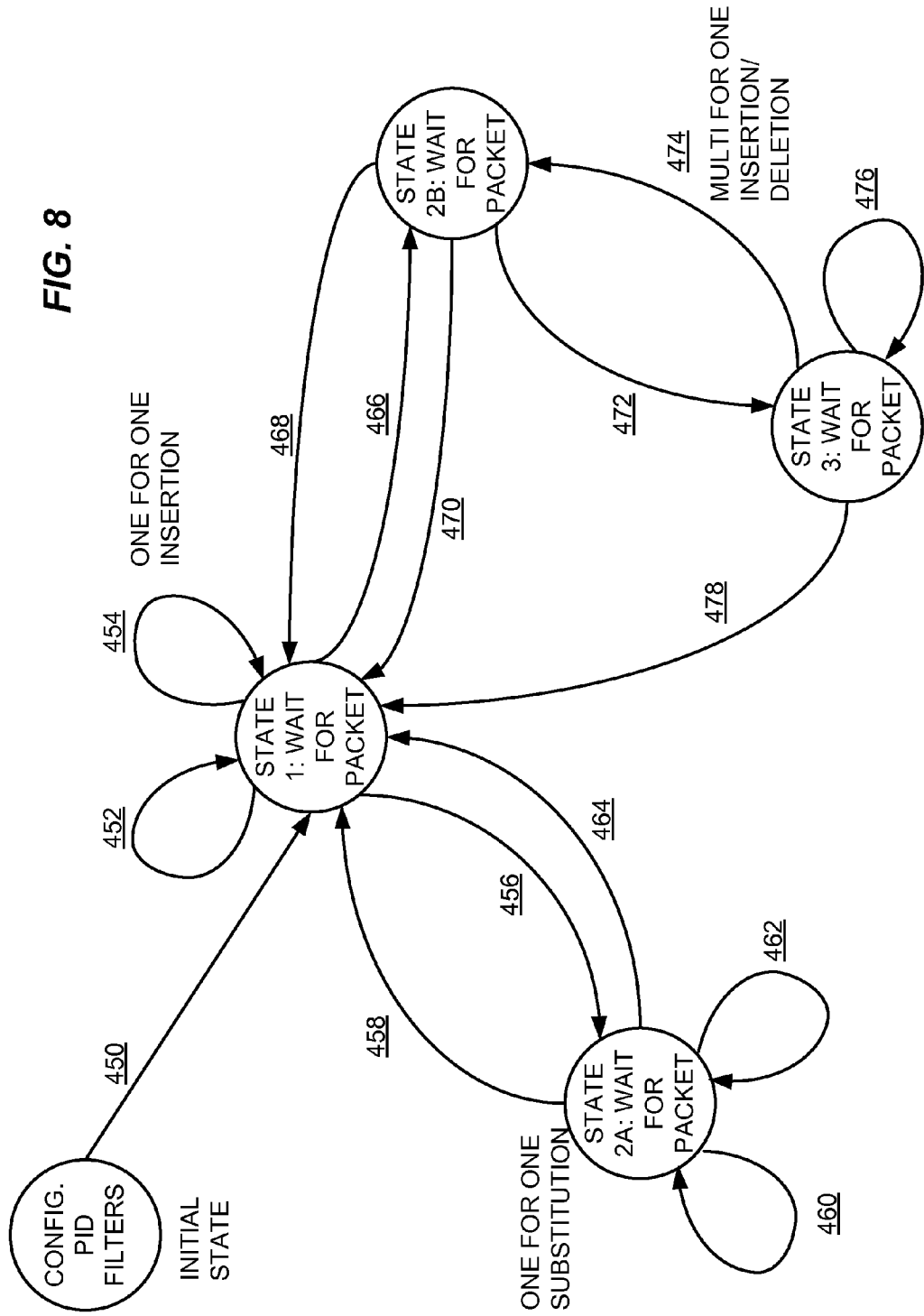
FIG. 8 is a state diagram of a decoder state machine consistent with certain embodiments of the present invention.

Turning now to FIG. 8, a state diagram is shown which depicts one mechanism for implementing a decoder that decodes the transport stream with multiple PIDs consistent with certain embodiments of the present invention. The numbered paths of the state diagram are explained in the table below:

STATE TABLE

| PATH NUMBER | CONDITIONS |
|---|---|
| 450 | Transition from initialization state |
| 452 | PID=A :Queue Packet |
| 454 | (PID=B, Mode=2) :PID=A :Queue Packet (Insertion) |
| 456 | (PID=B, Mode=1) :PID=A :Queue Packet (Substitution) |
| 458 | PID=A :PID=NULL |
| 460 | (PID=B, Queue_on_Error) :Error_IRQn |
| 462 | (PID=B, Queue_on_Error) :PID=A :Queue Packet :Error_IRQn |
| 464 | Decode_RSTn + MPEG Transport Error |
| 466 | (PID B, Mode 4): PID=A : Queue Packet (Insertion/Deletion) |
| 468 | PID B :PID=A :Queue Packet |
| 470 | Decode_RSTn + MPEG Transport Error |
| 472 | PID=A :PID=NULL |
| 474 | PID=B :PID=A :Queue Packet |
| 476 | PID=A :PID=NULL |
| 478 | Decode_RSTn + MPEG Transport Error |

The replacement of the primary PID packet by the secondary PID packet is called "Substitution Mode". Secondary PID packets may be inserted into the stream without replacement of a primary PID packet. This mode is called "Insertion Mode." In fact, the decoder may be used in a mode wherein both operations are active at the same time. This is called "Insertion and Deletion Mode". All three discrete decoder modes are mutually exclusive and follow a series of state transitions that are specific to each mode. The active mode is signaled through the decoder specific variable mode. If the value of mode is set to zero, decoding is not enabled and the transport decoder state machine is bypassed. If the value of mode is invalid (not a specifically defined state, then the same actions are taken as if mode was set to zero, i.e. the transport decoder state machine is bypassed. The definition of the state transitions for each mode is detailed as followed.

The algorithm for decoding an encoded transport stream is embodied in the state machine of FIG. 8. The Petri net showing the states and the state equations/actions can be derived from FIG. 8 in combination with the above state table. The algorithm has four operating states, with the system predominantly remaining is state 1. State 2 is entered only when a packet containing a shadow PID (not the main PID) has been encountered. Depending upon the system mode, as established through messaging in the PSI from the headend, different paths to two entirely different second states can be taken.

The state machine can be implemented in either hardware or software, depending upon the IC manufacturer's device architecture. A software implementation on a programmed processor can generally be expected to provide more flexibility in the design.

One error case identified (illegal state transition). This error is a unique error that is in addition to MPEG transport layer errors like continuity count, transport error, etc. Error_IRQn is the detection of two adjacent shadow packets without an intervening legacy packet, with n representing the number of the specific decoder. Depending upon the setting of the decoder specific variable queue_on_error, two different operations can occur. If the variable is set to true, the decoder will process the second shadow packet (PID=B) as in the non-error case. If the variable is set to false, the second shadow packet is discarded.

Whenever packets are inserted or deleted, the continuity count (CC) of the primary stream (PID=A), will be preserved by adjusting the CC as appropriate. The decode_RSTn variable is a non-latching bit that can be set through a configuration register or accessed by other functions to force the decoder state machine n to a known state.

Figure 9:
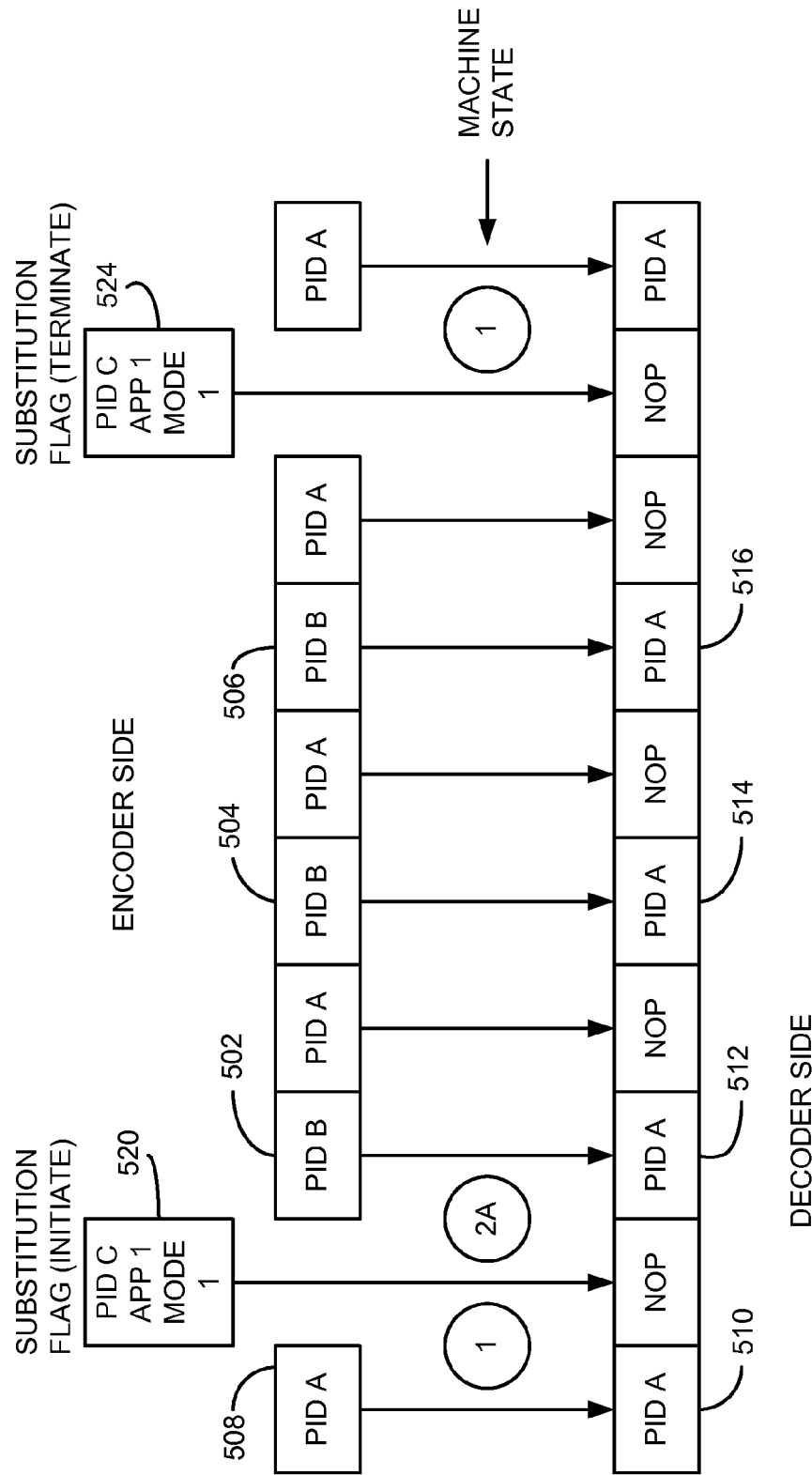
FIG. 9 illustrates a substitution mode consistent with certain embodiments of the present invention.

One mode of operation of the decoder transport processing algorithm is referred to as the Substitution Mode. This mode is illustrated in FIG. 9 wherein packets having PID B such as 502, 504 and 506 are inserted into the transport stream by replacement of PID B with PID A to produce packets 512, 514 and 516 for an MPEG compliant transport stream with the desired content packets containing a PID field matching A, where A is a 13 bit value previously defined in a configuration register of the decoder. A "no operation" is carried out for PID A packets. In the "home" state, state 1, A packets such as 508 become packets such as 510 are sent to the transport filter output queue for further processing, such as A/V decompression and display. In mode 1, the decoder state machine transitions from state 1 to state 2A upon reception of a MPEG packet with the PID field matching B, after receipt of a substitution flag 520. B is a 13 bit value previously defined in a configuration register of the decoder. B represents the secondary or "shadow" packet to be substituted for the next occurring legacy packet with PID matching A. The PID value of the B packet is changed to A before insertion into the stream. The substitution occurs because upon transition to state 2A, the B packet content is sent to the transport filter output queue.

The return to state 1 occurs when the next A PID is received. In this case, it is not queued and is converted to the NULL (0x1fff) PID value, effectively erasing it from the stream without altering the overall stream timing as would have occurred if it were physically removed. The return to state 1 can also be signaled by receipt of another substitution flag 524 indicating termination of the substitute mode.

Figure 10:
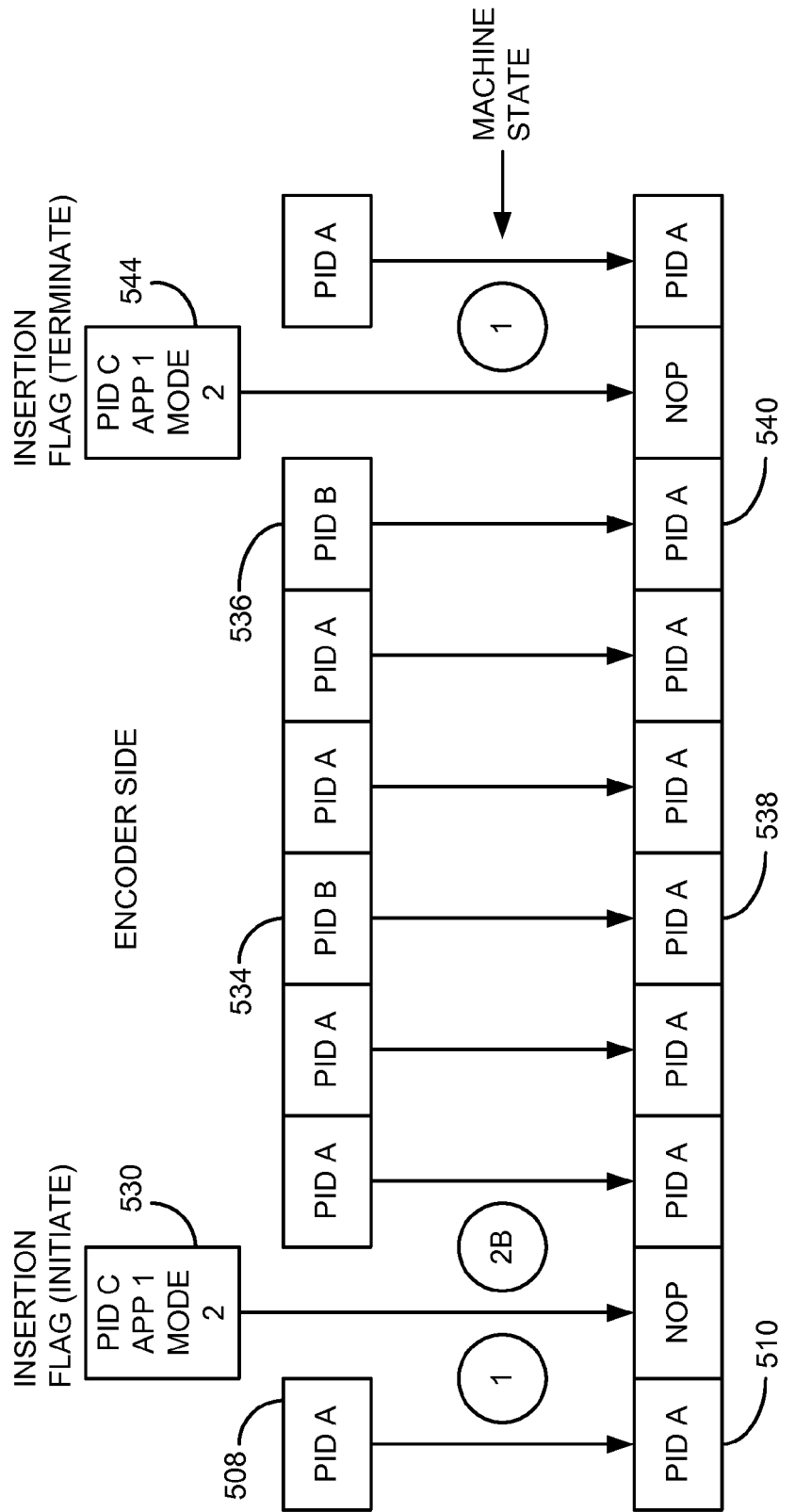
FIG. 10 illustrates an insertion mode consistent with certain embodiments of the present invention.

Another mode of operation of the decoder transport processing algorithm is referred to as the Insertion Mode, which is depicted in FIG. 10, for an MPEG compliant transport stream with the desired content packets containing a PID field matching A, where A is a 13 bit value previously defined in a configuration register of the decoder. In the "home" state, state 1, A packets are sent to the transport filter output queue for further processing, such as A/V decompression and display. In mode 2, the decoder state machine never transitions from state 1. Upon reception of a MPEG packet with the PID field matching B, where B is a 13 bit value previously defined in a configuration register of the decoder, B represents the secondary or "shadow" packet to be inserted into the stream with the PID value changed to A. In this mode, transition from state 1 to state 2B can occur due to receipt of an insertion flag 530. PID B packets such as 534 and 536 are inserted into the transport stream as PID A packets such as 538 and 540. The insertion mode can terminate by receipt of the next insertion flag 544.

Figure 11:
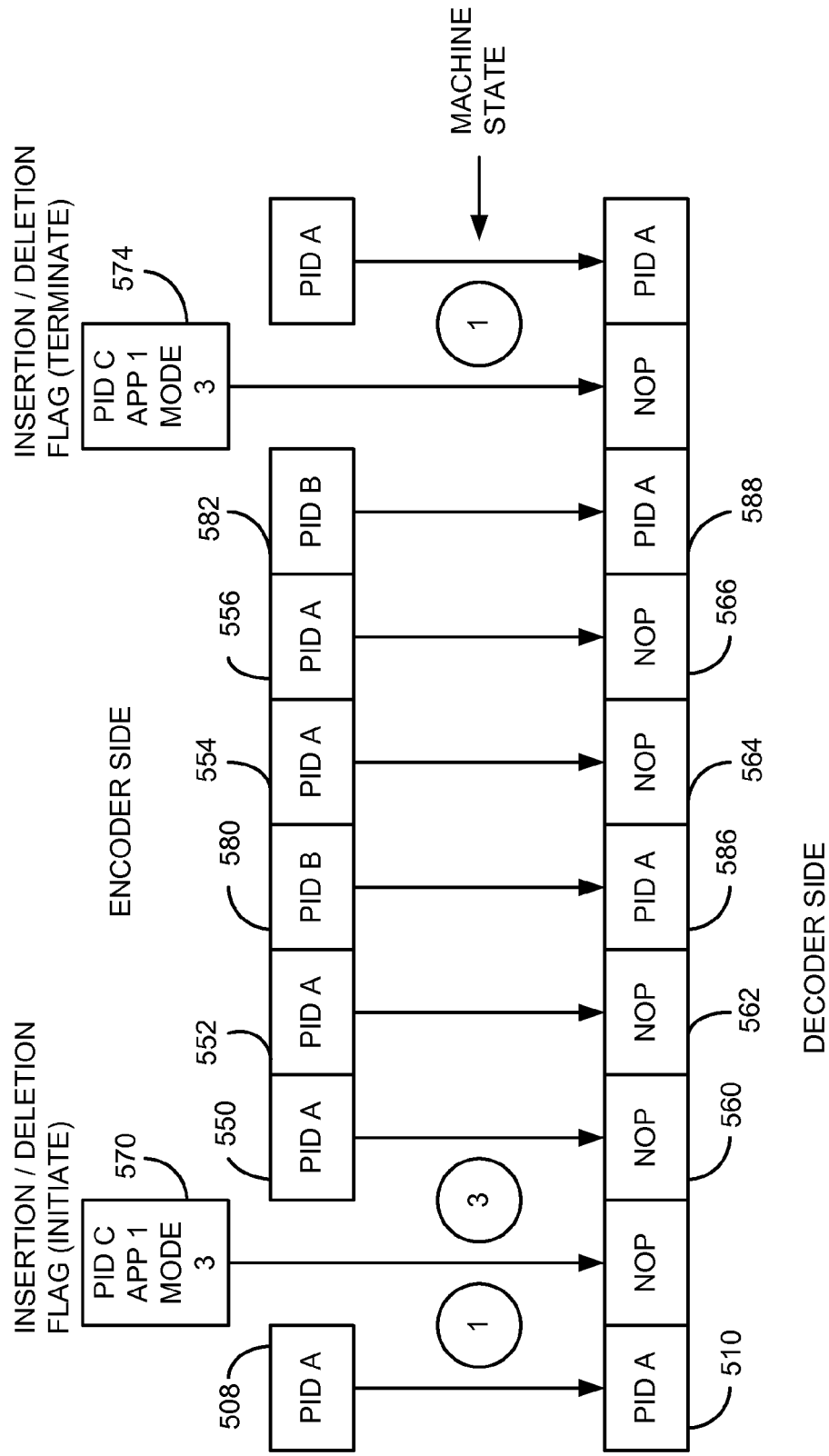
FIG. 11 illustrates an insertion/deletion mode consistent with certain embodiments of the present invention.

The decoder transport processing algorithm for the Insertion/Deletion Mode for a MPEG compliant transport stream with the desired content packets containing a PID field matching A, where A is a 13 bit value previously defined in a configuration register of the decoder is depicted in FIG. 11. In the "home" state, state 1, A packets such as 508 are sent to the transport filter output queue for further processing, such as A/V decompression and display and become packets 510. In mode 4, the decoder state machine transitions from state 1 to state 2B upon reception of a MPEG packet with the PID field matching B, where B is a 13 bit value previously defined in a configuration register of the decoder, B represents the secondary or "shadow" packet to be inserted with PID changed to match A. Any packet received while in state 2B with the PID value matching A will result in a transition to state 3 and the packet PID changed to NULL, effectively removing it from the transport stream. All subsequent packets received with PID matching A while in state 3 will result in their PID value also being changed to NULL such as packets 550, 552, 554 and 556 which become NULL as 560, 562, 564 and 566. Transition to and from state 1 can be initiated and terminated by an insertion/deletion flag 570 and 574 respectively. While in state 3, packets such as 580 and 582 with PID B are converted to packets with PID such as 586 and 588.

The return to state 2B occurs when the next packet with a B PID value is received and it is queued and converted to the A PID value. Likewise, return to the return to state 1 from state 2B occurs when the next packet with a B PID value is received accordingly, it is also queued and converted to the A PID value.

The method according to claim 1, wherein the substituting comprises using private signaling to select a unit of content with the second PID and discarding a unit of content with the first PID.

In methods consistent with the present invention, private signaling can be used to select a unit of content on the secondary PID while receiving content with the primary PID. Alternatively, private signaling can be used to select multiple units of content with the secondary PID while discarding units of content with the primary PID. Similarly, private signaling can be used to select multiple units of content with a secondary PID while receiving units of content with the primary PID. Also, private signaling can be used to switch from a mode of selecting multiple units of content with the secondary PID while discarding units of content with the primary PID to a mode of selecting multiple units of content with the secondary PID while receiving content with the primary PID. Private signaling can also be used to switch from a mode of selecting multiple units of content with the secondary PID and receiving multiple units of content with the primary PID to a mode of selecting multiple units of content with the secondary PID while discarding units of content with the primary PID.

A unit of content with the secondary PID is sent before or after a corresponding unit of content with the primary PID. Substitution operations can be initiated and terminated by private signaling forming part of an adaptation layer of packets in a data stream. The adaptation layer can be in a packet with the secondary PID, the primary PID or another PID.

For reference, the following two tables are provided which call out the syntax used for an MPEG transport packet and an MPEG transport stream adaptation field respectively:

| TRANSPORT PACKET | | |
| --- | --- | --- |
| Syntax | No. of bits | Mnemonic |
| transport_packet( ){ | | |
|   sync_byte | 8 | bslbf |
|   transport_error_indicator | 1 | bslbf |
|   payload_unit_start_indicator | 1 | bslbf |
|   transport_priority | 1 | bslbf |
|   PID | 13 | uimsbf |
|   transport_scrambling_control | 2 | bslbf |
|   adaptation_field_control | 2 | bslbf |
|   continuity_counter | 4 | uimsbf |
|   if(adaptation_field_control == '10' \|\| | | |
| adaptation_field_control == '11'){ | | |
|     adaptation_field( ) | | |
|   } | | |
|   if(adaptation_field_control == '01' \|\| | | |
| adaptation_field_control == '11') { | | |
|     for (i = 0; i < N; I++){ | | |
|       data_byte | 8 | bslbf |
|     } | | |
|   } | | |
| } | | |

| TRANSPORT STREAM ADAPTATION FIELD | | | |
|---|---|---|---|
| Syntax | No. of bits | Value | Mnemonic |
| adaptation_field( ) { | | | |
|   adaptation_field_length | 8 | | uimsbf |
|   if (adaptation_field_length > 0) { | | | |
|     discontinuity_indicator | 1 | x | bslbf |
|     random_access_indicator | 1 | x | bslbf |
|     elementary_stream_priority_indicator | 1 | 0 | bslbf |
|     PCR_flag | 1 | 0 | bslbf |
|     OPCR_flag | 1 | 0 | bslbf |
|     splicing_point_flag | 1 | 0 | bslbf |
|     transport_private_data_flag | 1 | 1 | bslbf |
|     adaptation_field_extension_flag | 1 | | bslbf |
|     if (PCR_flag == '1') { | | | |
|       Program_clock_reference_base | 33 | N/A | uimsbf |
|       Reserved | 6 | | bslbf |
|       Program_clock_reference_extension | 9 | | uimsbf |
|     } | | | |
|     if (OPCR_flag == '1') { | | | |
|       Original_program_clock_reference_base | 33 | N/A | uimsbf |
|       Reserved | 6 | | bslbf |
|       Original_program_clock_reference_extension | 9 | | uimsbf |
|     } | | | |
|     if (splicing_point_flag == '1') { | | N/A | |
|       splice_countdown | 8 | | tcimsbf |
|     } | | | |
|     if (transport_private_data_flag == '1') { | | | |
|       transport_private_data_length | 8 | | uimsbf |
|       for (i = 0; i < transport_private_data_length; i++) { | | | |
|         private_data_byte | 8 | | bslbf |
|       } | | | |
|     } | | | |
|     if (adaptation_field_extension_flag == '1') { | | N/A | |
|       adaptation_field_extension_length | 8 | | uimsbf |
|       ltw_flag | 1 | | bslbf |
|       piecewise_rate_flag | 1 | | bslbf |
|       seamless_splice_flag | 1 | | bslbf |
|       Reserved | 5 | | bslbf |
|       if (ltw_flag == '1') { | | | |
|         Ltw_valid_flag | 1 | | bslbf |
|         Ltw_offset | 15 | | uimsbf |
|       } | | | |
|       if (piecewise_rate_flag == '1') { | | | |
|         Reserved | 2 | N/A | bslbf |
|         Piecewise_rate | 22 | | uimsbf |
|       } | | | |
|       if (seamless_splice_flag == '1') { | | | |
|         splice_type | 4 | N/A | bslbf |
|         DTS_next_AU[32..30] | 3 | | bslbf |
|         marker_bit | 1 | | bslbf |
|         DTS_next_AU[29..15] | 15 | | bslbf |
|         marker_bit | 1 | | bslbf |
|         DTS_next_AU[14..0] | 15 | | bslbf |
|         marker_bit | 1 | | bslbf |
|       } | | | |
|       for (i = 0; i < N; i++) { | | | |
|         Reserved | 8 | N/A | bslbf |
|       } | | | |
|     } | | | |
|     for (i = 0; i < N; i++) { | | | |
|       Stuffing_byte | 8 | | bslbf |
|     } | | | |
|   } | | | |
| } | | | |

Much of the information used to configure and control the decoder module comes from the MPEG PSI data contained in the transport stream and decoded by the STB middleware. Configuration and control can be achieved using extensions to the MPEG PSI specification specific to the current decoder when needed. In certain embodiments consistent with the present invention, the following table defines the extensions used and the private data syntax.

| PRIVATE DATA SYNTAX | | |
|---|---|---|
| Syntax | No. of bits | Mnemonic |
| transport_private_data( ) { | | |
|   if (transport_private_data_length > 0) { | | |
|     Decoder application | 16 | uimsbf |
|     Decoder mode | 16 | uimsbf |
|     if (Decoder application == '1') { | | |
|       Reserved | 13 | bslbf |
|       Decoder mode_3   (Multi-to-One Insertion & Deletion) | 1 | bslbf |
|       Decoder mode_2   (One-to-One Insertion) | 1 | bslbf |
|       Decoder mode_1   (One-to-One Substitution) | 1 | bslbf |
|     } | | |
|         /*** Multi-to-One Deletion & Insertion***/ | | |
|     if (Decoder application == '1' & Decoder mode = 3) { | | |
|       termination flag | 1 | uimsbf |
|       Reserved | 7 | uimsbf |
|       primary PID packets to delete (Optional) | 16 | uimsbf |
|       Length | 8 | uimsbf |
|         if (length > 0){ | | |
|           Reserved | 3 | uimsbf |
|           primary PID | 13 | uimsbf |
|           Reserved | 3 | uimsbf |
|           secondary PID | 13 | uimsbf |
|         } | | |
|     } | | |
|         /*** One-to-One Insertion***/ | | |
|     if (Decoder application == '1' & Decoder mode = 2) { | | |
|       termination flag | 1 | uimsbf |
|       Reserved | 7 | uimsbf |
|       Length | 8 | uimsbf |
|         if (length > 0){ | | |
|           Reserved | 3 | uimsbf |
|           primary PID | 13 | uimsbf |
|           Reserved | 3 | uimsbf |
|           secondary PID | 13 | uimsbf |
|         } | | |
|     } | | |
|         /*** One-to-One Substitution***/ | | |
|     if (Decoder application == '1' & Decoder mode = 1) { | | |
|       termination flag | 1 | uimsbf |
|       Reserved | 7 | uimsbf |
|       Length | 8 | uimsbf |
|         if (length > 0){ | | |
|           Reserved | 3 | uimsbf |
|           primary PID | 13 | uimsbf |
|           Reserved | 3 | uimsbf |
|           secondary PID | 13 | uimsbf |
|         } | | |
|     } | | |
|   } | | |
| } | | |

It may be possible to use "adaptation and no payload" as well as "adaptation with payload" to signal transition between states. Adaptation field only packets whether A, B or C can be made "null", e.g. NOP, or can simply be left in the stream.

In this document, references to "registers", which may imply a hardware implementation, can be freely interchanged with "variable" in a software or microcoded implementation. In either case, a common decoder module command/control structure and interface is desirable to achieve middleware compatibility across STB platforms of varying architecture and capability.

In certain preferred implementations, each decoder module contains 19 registers (or variables). Unless otherwise stated, all registers are read/write, meaning that the current value can be read back through the same interface used to write. All registers will be sequentially offset from a common base value (origin). The addresses in this specification are all relative to the base (offset values). The registers can be mapped as shown in the table below:

| REGISTER MAP | | |
|---|---|---|
| Address | Name | Resources |
| 0x00 | Interrupt Register | Read/Write |
| 0x01 | Primary PID Register, Decoder 1 | Read/Write |
| 0x02 | Secondary PID Register, Decoder 1 | Read/Write |
| 0x03 | Primary PID Register, Decoder 2 | Read/Write |
| 0x04 | Secondary PID Register, Decoder 2 | Read/Write |
| 0x05 | Primary PID Register, Decoder 3 | Read/Write |
| 0x06 | Secondary PID Register, Decoder 3 | Read/Write |
| 0x07 | Primary PID Register, Decoder 4 | Read/Write |
| 0x08 | Secondary PID Register, Decoder 4 | Read/Write |
| 0x09 | Primary PID Register, Decoder 5 | Read/Write |
| 0x0A | Secondary PID Register, Decoder 5 | Read/Write |
| 0x0B | Primary PID Register, Decoder 6 | Read/Write |
| 0x0C | Secondary PID Register, Decoder 6 | Read/Write |
| 0x0D | Decoder 1 Mode Register | Read/Write |
| 0x0E | Decoder 2 Mode Register | Read/Write |
| 0x0F | Decoder 3 Mode Register | Read/Write |
| 0x10 | Decoder 4 Mode Register | Read/Write |

-continued

| REGISTER MAP | | |
|---|---|---|
| Address | Name | Resources |
| 0x11 | Decoder 5 Mode Register | Read/Write |
| 0x12 | Decoder 6 Mode Register | Read/Write |
| 0x13 | Decoder Reset Register | Write |

Status registers are provided in accordance with the following table (Interrupt Source Register (Read Only)—Address: 0x00)

| STATUS REGISTERS | | |
|---|---|---|
| Bit | Name | Meaning |
| 15 | Decode_1_ERROR | Decoder 1 Consecutive Shadow Packets |
| 14 | Decode_2_ERROR | Decoder 2 Consecutive Shadow Packets |
| 13 | Decode_3_ERROR | Decoder 3 Consecutive Shadow Packets |
| 12 | Decode_4_ERROR | Decoder 4 Consecutive Shadow Packets |
| 11 | Decode_5_ERROR | Decoder 5 Consecutive Shadow Packets |
| 10 | Decode_6_ERROR | Decoder 6 Consecutive Shadow Packets |
| 9-0 | NA | Undefined |

If an interrupt is invoked, the associated bit will be set to "1". More than one bit may asserted simultaneously. If any bit is set, the decoder interrupts the host controller based upon the value of the mask register. The contents of the source register is bitwise ANDed with the mask register and the result logically ORed to form a single IRQ output. Interrupt Conditions are tabulated as follows Decode_n_ERROR Set on: Detection of two adjacent shadow packets without an intervening legacy packet.

Reset on: Read of interrupt status register.

A write only Interrupt Mask Register is at Address: 0x00. When an Interrupt Mask Register bit is "1", the associated interrupt is unmasked and when "0", it is masked. Masked interrupts will not generate an interrupt output to the host processor. The interrupt flag bit(s) of masked interrupts will still be valid in the interrupt register. The default power-up condition is for all interrupts to be masked (all "0's").

| Bit | Name | Meaning |
|---|---|---|
| 15 | Decode_1_ERROR | Decoder 1 Consecutive Shadow Packets |
| 14 | Decode_2_ERROR | Decoder 2 Consecutive Shadow Packets |
| 13 | Decode_3_ERROR | Decoder 3 Consecutive Shadow Packets |
| 12 | Decode_4_ERROR | Decoder 4 Consecutive Shadow Packets |
| 11 | Decode_5_ERROR | Decoder 5 Consecutive Shadow Packets |
| 10 | Decode_6_ERROR | Decoder 6 Consecutive Shadow Packets |
| 9-0 | NA | Undefined |

Configuration Registers are as above.

A primary PID register for Decoder 1 (Read/Write) appears at Address: 0x01 and is configured as follows.

| Bit | Name | Meaning |
|---|---|---|
| 15-13 | NA | Undefined |
| 12-0 | Primary_PID_1 | Packet ID value for Primary PID of Decoder 1 |

The Primary PID is a 13 bit value stored right justified as a big-endian (MSB in bit 12) value.

A secondary PID register Secondary PID Register for decoder 1 (Read/Write) appears at Address: 0x02 and is configured as follows:

| Bit | Name | Meaning |
|---|---|---|
| 15-13 | NA | Undefined |
| 12-0 | Secondary_PID_1 | Packet ID value for secondary ("shadow") PID, Decoder 1 |

The Secondary PID is a 13 bit value stored right justified as a big-endian (MSB in bit 12) value as shown above.

A primary PID register, for Decoder 2 (Read/Write) appears at Address: 0x03 and is configured as follows:

| Bit | Name | Meaning |
|---|---|---|
| 15-13 | NA | Undefined |
| 12-0 | Primary_PID_2 | Packet ID value for Primary PID of Decoder 2 |

The Primary PID is a 13 bit value stored right justified as a big-endian (MSB in bit 12) value.

A secondary PID register for decoder 2 (Read/Write) appears at Address: 0x04 and is configured as follows:

| Bit | Name | Meaning |
|---|---|---|
| 15-13 | NA | Undefined |
| 12-0 | Secondary_PID_2 | Packet ID value for secondary ("shadow") PID, Decoder 2 |

The Secondary PID is a 13 bit value stored right justified as a big-endian (MSB in bit 12) value.

A primary PID register, for decoder 3 (Read/Write) appears at Address: 0x05 and is configured as follows:

| Bit | Name | Meaning |
|---|---|---|
| 15-13 | NA | Undefined |
| 12-0 | Primary_PID_3 | Packet ID value for Primary PID of Decoder 3 |

The Primary PID is a 13 bit value stored right justified as a big-endian (MSB in bit 12) value.

A secondary PID register for decoder 3 (Read/Write) appears at Address: 0x06 and is configured as follows:

| Bit | Name | Meaning |
|---|---|---|
| 15-13 | NA | Undefined |
| 12-0 | Secondary_PID_3 | Packet ID value for secondary ("shadow") PID, Decoder 3 |

The Secondary PID is a 13 bit value stored right justified as a big-endian (MSB in bit 12) value.

A primary PID register for decoder 4 (Read/Write) appears at Address: 0x07 and is configured as follows:

| Bit | Name | Meaning |
|---|---|---|
| 15-13 | NA | Undefined |
| 12-0 | Primary_PID_4 | Packet ID value for Primary PID of Decoder 4 |

The Primary PID is a 13 bit value stored right justified as a big-endian (MSB in bit 12) value.

A secondary PID register for decoder 4 (Read/Write) appears at Address: 0x08 and is configured as follows:

| Bit | Name | Meaning |
|---|---|---|
| 15-13 | NA | Undefined |
| 12-0 | Secondary_PID_4 | Packet ID value for secondary ("shadow") PID, Decoder 4 |

The Secondary PID is a 13 bit value stored right justified as a big-endian (MSB in bit 12) value.

A primary PID register for decoder 5 (Read/Write) appears at Address: 0x09 and is configured as follows:

| Bit | Name | Meaning |
|---|---|---|
| 15-13 | NA | Undefined |
| 12-0 | Primary_PID_5 | Packet ID value for Primary PID of Decoder 5 |

The Primary PID is a 13 bit value stored right justified as a big-endian (MSB in bit 12) value.

A secondary PID register for decoder 5 (Read/Write) appears at Address: 0x0A and is configured as follows:

| Bit | Name | Meaning |
|---|---|---|
| 15-13 | NA | Undefined |
| 12-0 | Secondary_PID_5 | Packet ID value for secondary ("shadow") PID, Decoder 5 |

The Secondary PID is a 13 bit value stored right justified as a big-endian (MSB in bit 12) value.

A primary PID register for decoder 6 (Read/Write) appears at Address: 0x0B and is configured as follows:

| Bit | Name | Meaning |
|---|---|---|
| 15-13 | NA | Undefined |
| 12-0 | Primary_PID_6 | Packet ID value for Primary PID of Decoder 6 |

The Primary PID is a 13 bit value stored right justified as a big-endian (MSB in bit 12) value.

A secondary PID register for decoder 6 (Read/Write) appears at Address: 0x0C and is configured as follows:

| Bit | Name | Meaning |
|---|---|---|
| 15-13 | NA | Undefined |
| 12-0 | Secondary_PID_6 | Packet ID value for secondary ("shadow") PID, Decoder 6 |

The Secondary PID is a 13 bit value stored right justified as a big-endian (MSB in bit 12) value.

The Decoder 1 mode register (Read/Write) appears at Address: 0x0D and is configured as follows:

| Bit | Name | Default Value | Meaning |
|---|---|---|---|
| 15-13 | Decoder_1_Mode | Off (0) | Determines decoder 1 operating mode |
| 12 | Queue_on_Error1 | Drop (0) | Determines whether to queue or drop consecutive shadow packets when in mode 1 (1 = queue) for decoder 1 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The decoder 2 mode registers (Read/Write) appear at Address: 0x0E and are configured as follows:

| Bit | Name | Default Value | Meaning |
|---|---|---|---|
| 15-13 | Decoder_2_Mode | Off (0) | Determines decoder 2 operating mode |
| 12 | Queue_on_Error2 | Drop (0) | Determines whether to queue or drop consecutive shadow packets when in mode 1 (1 = queue) for decoder 2 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The Decoder 3 mode register (Read/Write) is at Address: 0x0F and is configured as follows:

| Bit | Name | Default Value | Meaning |
|---|---|---|---|
| 15-13 | Decoder_3_Mode | Off (0) | Determines decoder 3 operating mode |

-continued

| Bit | Name | Default Value | Meaning |
|---|---|---|---|
| 12 | Queue_on_Error3 | Drop (0) | Determines whether to queue or drop consecutive shadow packets when in mode 1 (1 = queue) for decoder 3 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The Decoder 4 Mode Register (Read/Write) appears at Address: 0x10 and is configured as follows:

| Bit | Name | Default Value | Meaning |
|---|---|---|---|
| 15-13 | Decoder_4_Mode | Off (0) | Determines decoder 4 operating mode |
| 12 | Queue_on_Error4 | Drop (0) | Determines whether to queue or drop consecutive shadow packets when in mode 1 (1 = queue) for decoder 4 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The Decoder 5 mode register (Read/Write) appears at Address: 0x11 and is configured as follows:

| Bit | Name | Default Value | Meaning |
|---|---|---|---|
| 15-13 | Decoder_5_Mode | Off (0) | Determines decoder 5 operating mode |
| 12 | Queue_on_Error5 | Drop (0) | Determines whether to queue or drop consecutive shadow packets when in mode 1 (1 = queue) for decoder 5 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The Decoder 6 mode register (Read/Write) is at Address: 0x12 and is configured as follows:

| Bit | Name | Default Value | Meaning |
|---|---|---|---|
| 15-13 | Decoder_6_Mode | Off (0) | Determines decoder 6 operating mode |
| 12 | Queue_on_Error6 | Drop (0) | Determines whether to queue or drop consecutive shadow packets when in mode 1 (1 = queue) for decoder 6 |
| 11-0 | Undefined | NA | Undefined |

Mode definitions are as follows:
0: Bypass all decode processing, disable state machine
1: Substitution mode
2: Insertion Mode
4: Insertion & Deletion Mode
All other values: Bypass all decode processing, disable state machine The Decoder reset register (Write) is located at Address: 0x13 and is configured as follows:

| Bit | Name | Default Value | Meaning |
|---|---|---|---|
| 15 | Decoder_RST1 | Off (0) | Decoder 1 Non-latching reset to state 1 |
| 14 | Decoder_RST2 | Off (0) | Decoder 2 Non-latching reset to state 1 |
| 13 | Decoder_RST3 | Off (0) | Decoder 3 Non-latching reset to state 1 |
| 12 | Decoder_RST4 | Off (0) | Decoder 4 Non-latching reset to state 1 |
| 11 | Decoder_RST5 | Off (0) | Decoder 5 Non-latching reset to state 1 |
| 10 | Decoder_RST6 | Off (0) | Decoder 6 Non-latching reset to state 1 |
| 9-0 | Undefined | NA | NA |

There is one error case identified (illegal state transition). This error is a unique error and is in addition to MPEG transport layer errors like continuity count, transport error, etc. Error_IRQn is the detection of two adjacent shadow packets without an intervening legacy packet, with n representing the number of the specific decoder. Depending upon the setting of the decoder specific variable queue_on_error, two different operations can occur. If the variable is set to true, the decoder will process the second shadow packet (PID=B) as in the non-error case. If the variable is set to false, the second shadow packet is discarded.

In some instances, content that is to be replaced is placed on packet boundaries. Since some information may not fit neatly within the boundaries of a packet, some additional content, which is not specifically the content of interest may need to be duplicated to fill up the packet. In other cases, the packet can simply be filled with null bytes (e.g., all zeros). A typical video slice contains approximately 3 to 8 packets depending upon how much intra-coded data is present. It is noted that some decoders may have difficulty with multiple slices on a single video line even though the MPEG2 specification allows for this.

It is also noted that there may be ending problems encountered if the substituted content is referenced from future frames. However, this can be resolved by establishing a rule that says that the substituted content cannot be referenced by past frames. This is due to the possibility that the content may be different depending upon the choice made by a customer or the set top box. Reference to future frames might be allowed if the reference is all contained within the substitute content. Also, since the encoder uses a specified set of quantization tables, substitute content should be processed using the same quantization table so that correct decoding can take place.

The present content substitution can be carried out either on line or off line depending upon the application, without limitation.

Figure 12:
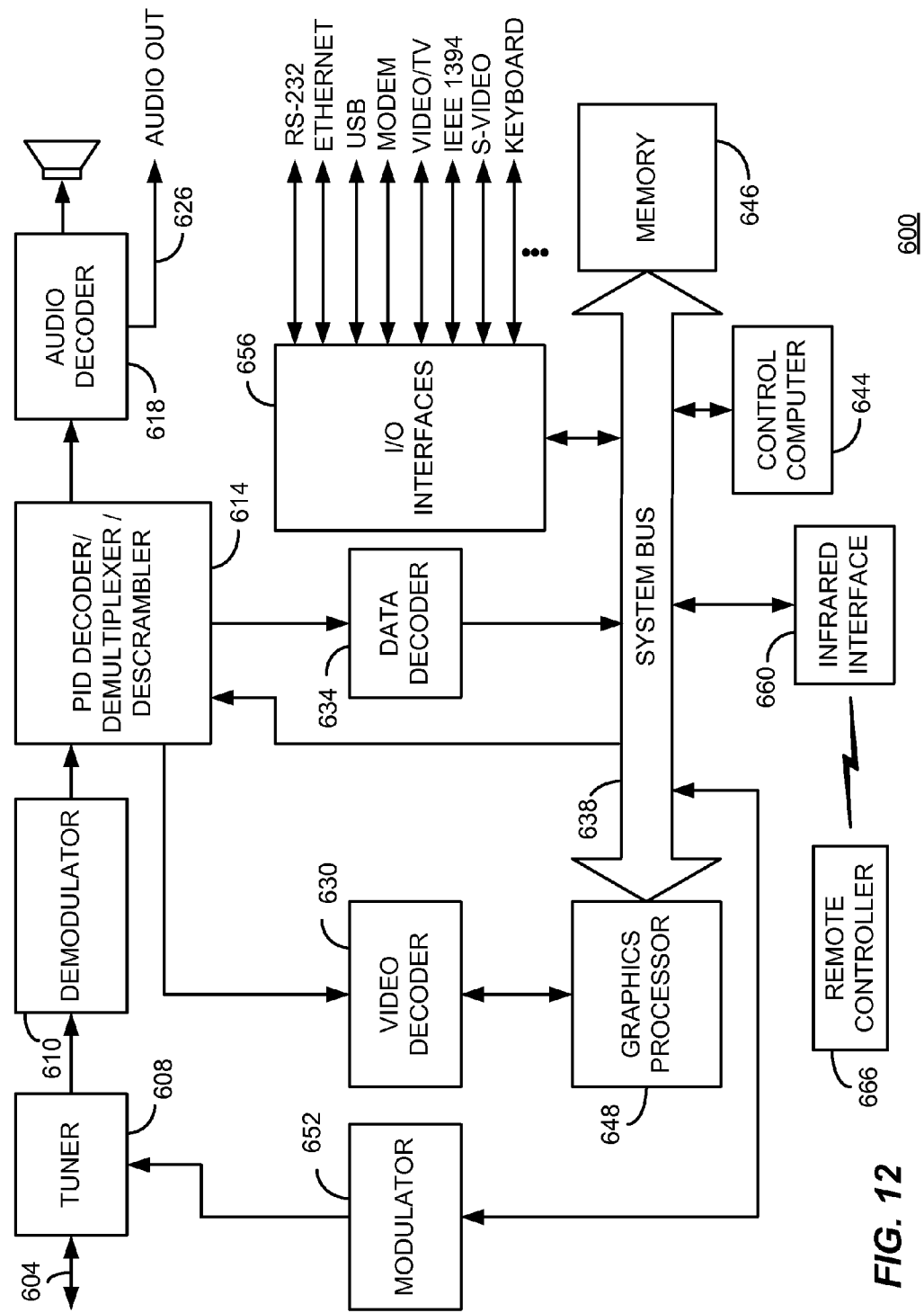
FIG. 12 illustrates an exemplary system configuration for a digital television Set-top box consistent with certain embodiments of the present invention.

A decoder such as the above can be incorporated within a television STB or other television receiver and can be used to provide the end user with content substitution capabilities controlled either by the user or by the MSO. Referring now to FIG. 12, an exemplary system configuration for a digital television Set-top box 600 is illustrated. Many configurations for such a STB are possible and the STB illustrated should only be considered as exemplary of such a STB configuration. In this exemplary set-top box, the transmission medium 604, such as a coaxial cable, is coupled by a suitable interface to a tuner 608. Tuner 608 may, for example, include a broadcast in-band tuner for receiving video content. A separate tuner (not shown) may be provided to receive conventional RF broadcast television channels. Modulated information formatted, for example, as MPEG-2 information is then demodulated at a demodulator 610. The demodulated information at the output of demodulator 610 is provided to a PID decoder/demultiplexer/descrambler circuit 614 where the information is separated into discrete channels of programming. The programming is divided into packets, each packet having a PID that identifies the packet as containing a particular type of data (e.g., audio, video, data) relating to a particular program. The PID decoder/demodulator/descrambler circuit 614 also decrypts encrypted information in accordance with a decryption algorithm to prevent unauthorized access to programming content, for example. The PID decoder portion of 614 can operate in a manner similar to that of the decoder described by the stated diagram of FIG. 8 under program control to select content having a particular PID as will be described later.

Audio packets from the demultiplexer 614 (those identified with an audio PID) are decrypted and forwarded to an audio decoder 618 where they may be converted to analog audio to drive a speaker system (e.g., stereo or home theater multiple channel audio systems) or other audio system 622 (e.g., stereo or home theater multiple channel amplifier and speaker systems) or may simply provide decoded audio out at 626. Video packets from the demultiplexer 614 (those identified with a video PID) are decrypted and forwarded to a video decoder 630. In a similar manner, data packets from the demultiplexer 614 (those identified with a data PID) are decrypted and forwarded to a data decoder 634.

Decoded data packets from data decoder 634 are sent to the set-top box's computer system via the system bus 634. A control computer 644 can thus access the decoded data from data decoder 634 via the system bus 638 as well as programs and data in memory 646. Video data decoded by video decoder 630 is passed to a graphics processor 648, which is a computer optimized to processes graphics information rapidly. Graphics processor 648 is particularly useful in processing graphics intensive data associated with Internet browsing, gaming and multimedia applications such as those associated with MHEG (Multimedia and Hypermedia information coding Experts Group) set-top box applications. It should be noted, however, that the function of graphics processor 648 may be unnecessary in some set-top box designs having lower capabilities, and the function of the graphics processor 648 may be handled by the control computer 644 in some applications where the decoded video is passed directly from the demultiplexer 614 to a video encoder. Graphics processor 648 is also coupled to the system bus 638 and operates under the control of control computer 644.

Many set-top boxes such as STB 600 may incorporate a smart card reader 140 for communicating with a so called "smart card," often serving as a Conditional Access Module (CAM). The CAM typically includes a central processor unit of its own along with associated RAM and ROM memory. Such smart card based CAMs are conventionally utilized for authentication of the user and authentication of transactions carried out by the user as well as authorization of services and storage of authorized cryptography keys. For example, the CAM can be used to provide the key for decoding incoming cryptographic data for content that the CAM determines the user is authorized to receive.

STB 600 can operate in a bidirectional communication mode so that data and other information can be transmitted not only from the system's head end to the end user, or from a service provider to the end user of the STB 600, but also, from the end user upstream using an out-of-band channel. In one embodiment, such data passes through the system bus 638 to a modulator 652 through a diplexer forming part of tuner 604 and out through the transmission medium 604. This capability is used to provide a mechanism for the STB 600 and/or its user to send information to the head end (e.g., service requests or changes, registration information, etc.) as well as to provide fast outbound communication with the Internet or other services provided at the head end to the end user.

Set-top box 600 may include any of a plurality of I/O (Input/Output) interfaces represented by I/O interfaces 656 that permit interconnection of I/O devices to the set-top box 600. By way of example, and not limitation, a serial RS-232 port can be provided to enable interconnection to any suitable serial device supported by the STB 600's internal software. Similarly, communication with appropriately compatible devices can be provided via an Ethernet port, a USB (Universal Serial Bus) port, an IEEE 1394 (so-called Firewire™ or i-link™) or IEEE 1394 wide port, or S-video port. An infrared interface 660 provides communication with a remote controller 666. Such interfaces can be utilized to interconnect the STB 600 with any of a variety of accessory devices such as storage devices, audio/visual devices, gaming devices (not shown), Internet Appliances 28, etc.

I/O interfaces 656 can also include a modem (be it dial-up, cable, DSL or other technology modem) having a modem port to facilitate high speed or alternative access to the Internet or other data communication functions. In one preferred embodiment, modem port 162 is that of a DOCSIS (Data Over Cable System Interface Specification) cable modem to facilitate high speed network access over a cable system, and port is appropriately coupled to the transmission medium 604 embodied as a coaxial cable. Thus, the STB 600 can carry out bidirectional communication via the DOCSIS cable modem with the STB 600 being identified by a unique IP address. The DOCSIS specification is publicly available.

A PS/2 or other keyboard/mouse/joystick interface can be provided to permit ease of data entry to the STB 600. Such inputs provide the user with the ability to easily enter data and/or navigate using pointing devices. Pointing devices such as a mouse or joystick may be used in gaming applications.

Of course, STB 600 also may incorporate basic video outputs that can be used for direct connection to a television set instead of (or in addition to) an IEEE 1394 connection. In one embodiment, the video output can provide composite video formatted as NTSC (National Television System Committee) video. In some embodiments, the video output can be provided by a direct connection to the graphics processor 648 or the demultiplexer/descrambler 614 rather than passing through the system bus 638 as illustrated in the exemplary block diagram. S-Video signals can be similarly provided without passing through the system bus 130 if desired in other embodiments.

The infrared interface 660 receives commands from an infrared remote control 666, infrared keyboard or other infrared control device. Although not explicitly shown, front panel controls may be used in some embodiments to directly control the operation of the STB 600 through a front panel control interface as one of the provided interfaces. Selected interfaces such as those described above and others can be provided in STB 600 in various combinations as required or desired.

In one illustrative embodiment consistent with the present invention, the STB 600 can be utilized to control multiple content as in, for example, selection from multiple endings. In one such scenario, the main program content having a designated set of PIDS is played out in a normal manner until near the end of the program. At this point, the viewer is presented with a menu selection on screen from which one of a plurality of endings is presented. As a simple example, there may be three possible endings associated with three sets of PIDs as follows: 1) PID A—Boy gets girl, good guys win, 2) PID B—Girl dies, good guys win, and 3) PID C—Girl dies, bad guys win.

Using the remote controller 666 or any other suitable input mechanism, the viewer selects from the possible endings. A limited time may be provided to make this selection prior to a default ending being shown (e.g., a two minute pause in content to allow the selection of the ending). In response to the user's selection, control computer 644 programs PID decoder 614 to select the ending chosen by the user. After this pause, is completed, the programming continues with the PID decoder 614 making the appropriate PID remapping to cause the audio, data and video for the selected ending to be played. Thus, if the program is normally associated with PID A and the user selects ending three, packets bearing PID C will be remapped to PID A for playback. Thus, in this embodiment, the user can make selections for playback of a particular segment of content that is substituted for the normal content.

Accordingly, a decoder consistent with certain embodiments of the present invention has a receiver receiving data that represents content, the data having at least first and second packet identifiers (PIDs) associated with first and second portions of content. A content decoder is configured to play content having the first PID. A controller determines that a substitution criterion has been met, and a PID mapper maps content having the second PID to the first PID so that the content originally having the second PID is played.

Thus, a method and apparatus for content substitution, consistent with certain embodiments of the present invention involves receiving data representing content, the data having at least first and second packet identifiers (PIDs) associated with first and second portions of content. The content having the first PID is placed into a data stream. An initiation flag is received indicating initiation of a PID mapping operation. The content having the second PID is then mapped to the first PID and the mapped content is placed into the data stream. A termination flag is received indicating termination of the PID mapping operation at which point the process returns to placing content having the first PID into the data stream. The content substitution process can be used to replace advertisements, provide multiple plots, multiple endings, multiple views as well as other applications.

In certain implementations, a method of content substitution involves receiving an ordered stream of packets containing content marked by a first packet identifier (PID) and one or more substitute content portions marked by one or more secondary PIDs, where the number and placement of packets marked by secondary PIDs ahead of packets marked by the first PID in the stream is retained during transmission of the ordered stream of packets; initiating processing for display or storage of content contained in packets having the first PID; initiating processing for display or storage of content contained in packets having a selected secondary PID that meets a substitution criterion; and either deleting or processing the content having the first PID depending upon a number of received intervening packets having secondary PIDs that reside between the packets having the first PID and the packets having the selected secondary PID that meets the substitution criterion.

In certain embodiments, the content comprises one of streamed data, a data file and a packaged medium containing a data file. In certain embodiments, the method is carried out in a decoder forming a part of a television Set-top box. In certain embodiments, the method is carried out in at least one of a hardware state machine and a programmed processor. In certain embodiments, the substitution criterion is met as a result of an interactive operator input from an operator viewing said content. In certain embodiments, the content comprises at least one of audio and video content. In certain embodiments, the substitution criterion is met as a result of at least one of an operator input, signaling in a program map table (PMT), and signaling in an MPEG adaptation layer. In certain embodiments, the content is substituted on a packet for packet basis. In certain embodiments, multiple packets of content are substituted for a single packet. In certain embodiments, the processing comprises playing the content. In certain embodiments, the substituting comprises selecting a unit of content with the second PID and discarding a unit of content with the first PID. In certain embodiments, the substituting comprises selecting a unit of content on the second PID while receiving content with the first PID. In certain embodiments, the substituting comprises selecting multiple units of content with the second PID while discarding units of content with the first PID. In certain embodiments, the substituting comprises selecting multiple units of content with a second PID while receiving units of content with the first PID. In certain embodiments, the substituting comprises switching from a mode of selecting multiple units of content with the second PID while discarding units of content with the first PID to a mode of selecting multiple units of content with the second PID while receiving content with the first PID. In certain embodiments, the substituting comprises switching from a mode of selecting multiple units of content with the second PID and receiving multiple units of content with the first PID to a mode of selecting multiple units of content with the second PID while discarding units of content with the first PID. In certain embodiments, a unit of content with the second PID is sent before a corresponding unit of content with the first PID. In certain embodiments, a unit of content with the second PID is sent after a corresponding unit of content with the first PID. In certain embodiments, substitution is initiated and terminated by private signaling forming part of an adaptation layer of packets in a data stream. In certain embodiments, the adaptation layer is in a packet with the second PID. In certain embodiments, the adaptation layer is in a packet with the first PID. In certain embodiments, the adaptation layer is in a packet that is neither the second nor the first PID. In certain embodiments, the processing comprises playing back the content. A computer readable medium can be used for storing instructions which, when executed on a programmed processor, carry out any of the above content substitution methods.

Another method of triggering content substitution involves receiving an ordered stream of packets containing content marked by a first packet identifier (PID) and substitute content marked by a secondary PID, and where the number and placement of packets marked by secondary PIDs ahead of packets marked by the first PID in the stream is retained during transmission of the ordered stream of packets; determining if a number of intervening packets having secondary PIDs that reside between the packets having the first PID and the packets having a selected secondary PID is an odd number or an even number; if the number is a first of either an odd number or an even number of intervening packets having secondary PIDs that reside between the packets having the first PID and the packets having the selected secondary PID is received, interpreting receipt of said number of intervening packets as an instruction that triggers ignoring subsequent packets marked with a primary PID, and mapping the portions of the content having the secondary PIDs to the primary PID and placing the mapped content into the data stream as a substitute for the first portion of the content; if the number is the other of either an even number or an odd number of intervening packets having secondary PIDs that reside between the packets having the first PID and the packets having the selected secondary PID is received, interpreting receipt of said number of intervening packets as an instruction that triggers processing subsequent packets marked with the primary PID.

In certain embodiments, the method can be carried out in a decoder forming a part of a television set-top box. In certain embodiments, the method can be carried out in at least one of a hardware state machine and a programmed processor. In certain embodiments, receipt of the initiation flag is indicative of meeting a substitution criterion, such substitution criteria being met as a result of an interactive operator input from an operator viewing said content. In certain embodiments, receipt of the initiation flag is indicative of meeting a substitution criterion. In certain embodiments, the substitution criterion is met as a result of an operator input. In certain embodiments, the content is substituted on a packet for packet basis. In certain embodiments, multiple packets of content are substituted for a single packet. In certain embodiments, the substituting comprises using private signaling to select a unit of content with the secondary PID and discarding a unit of content with the primary PID. In certain embodiments, a unit of content with the second PID is sent before a corresponding unit of content with the first PID. In certain embodiments, a unit of content with the second PID is sent after a corresponding unit of content with the first PID. In certain embodiments, substitution is initiated and terminated by private signaling forming part of the adaptation layer of packets in a data stream. In certain embodiments, the adaptation layer is in a packet with the one of the primary PID and the secondary PID. In certain embodiments, the adaptation layer is in a packet that has neither the secondary nor the primary PID. A computer readable medium storing instructions which, when executed on a programmed processor can carry out any of the content substitution methods above.

A content multiplexer which creates an ordered stream of packets with primary and substitute content has a circuit for receiving input data representing main content. Input data representing substitution content are received, such substitution content being for replacement of at least a portion of the main content. A packet identifier (PID) mapper assigns a primary PID to the main content and assigns a secondary PID to the substitution content. A multiplexer multiplexes an even or odd number of packets with the secondary PID ahead of packets with the primary PID depending on whether the primary packets are to be ignored or processed by a receiving device. The content multiplexer can be implemented using a programmed computer.

A decoder consistent with certain embodiments has a receiver receiving an ordered stream of data that represents content ordered in a first and a second substitutable portion, the data encoded using at least first and second packet identifiers (PIDs) associated with first and second substitutable portions of content. The receiver receives an odd or even number of packets with the PIDs after a packet with a primary PID, wherein starting or stopping content substitution is determined by whether the number of packets is an odd or an even number. A content decoder is configured to play content having the first PID. A controller determines that a substitution criterion has been met by virtue of receipt of the content having the secondary PID. A PID mapper maps content from the received data content having the second PID to the received data content having the first PID so that the received data content originally having the second PID is played.

In certain embodiments, the decoder resides in a television set-top box. In certain embodiments, the substitution criterion comprises an interactive user selection to play the second portion. In certain embodiments, the second portion of content represents one of an alternative advertisement, an alternative view, an alternative ending and an alternative plot.

Those skilled in the art will recognize that the present invention has been described in terms of exemplary embodiments based upon use of a programmed processor (e.g., computer 300). However, the invention should not be so limited, since the present invention could be implemented using hardware component equivalents such as special purpose hardware and/or dedicated processors that are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention. Moreover, although the present invention has been described in terms of a general purpose personal computer providing a playback mechanism, the playback can be carried on a dedicated machine without departing from the present invention. Conversely, the present decoder has been described in terms of a state machine and such state machine can be implemented as either a hardware or software based state machine. Moreover, those skilled in the art will understand that the exact register configurations, PID protocols and other details described in connection with the above exemplary embodiment should not be considered limiting, but are presented by way of illustration.

Those skilled in the art will appreciate that the program steps and associated data used to implement the embodiments described above can be implemented using disc storage as well as other forms of storage such as for example Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above form that can be stored on any suitable electronic storage medium or otherwise be present in any computer readable medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Software code and/or data embodying certain aspects of the present invention may be present in any tangible computer readable medium, or storage medium including, but not limited to, electronic storage devices such as those described above, and other media that stores, the code and/or data. In the present exemplary embodiments, MPEG compliant packets, slices, tables and other data structures are used, but this should not be considered limiting since other data structures can similarly be used without departing from the present invention.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims..

What is claimed is:

1. A method of content substitution, comprising:
receiving an ordered stream of packets containing content marked by a first packet identifier (PID) and one or more substitute content portions marked by one or more secondary PIDs, where the number and placement of packets marked by secondary PIDs ahead of packets marked by the first PID in the stream is retained during transmission of the ordered stream of packets;
the ordered stream of packets comprising an odd or even number of packets with the PIDs after a packet with a first PID;
initiating processing for display or storage of content contained in packets having the first PID;
initiating processing for display or storage of content contained in packets having a selected secondary PID that meets a substitution criterion; and
either deleting or processing the content having the first PID depending upon a number of received intervening packets having secondary PIDs that reside between the packets having the first PID and the packets having the selected secondary PID that meets the substitution criterion, where deleting or processing is determined by whether the number of packets is an odd or an even number.

2. The method according to claim 1, wherein the content comprises one of streamed data, a data file and a packaged medium containing a data file.

3. The method according to claim 1, carried out in a decoder forming a part of a television Set-top box.

4. The method according to claim 1, carried out in at least one of a hardware state machine and a programmed processor.

5. The method according to claim 1, wherein the substitution criterion is met as a result of an interactive operator input from an operator viewing said content.

6. The method according to claim 1, wherein the content comprises at least one of audio and video content.

7. The method according to claim 1, wherein the substitution criterion is met as a result of at least one of an operator input, signaling in a program map table (PMT), and signaling in an MPEG adaptation layer.

8. The method according to claim 1, wherein the content is substituted on a packet for packet basis.

9. The method according to claim 1, wherein multiple packets of content are substituted for a single packet.

10. The method according to claim 1, wherein the processing comprises playing the content.

11. The method according to claim 1, wherein the substituting comprises selecting a unit of content with the second PID and discarding a unit of content with the first PID.

12. The method according to claim 1, wherein the substituting comprises selecting a unit of content on the second PID while receiving content with the first PID.

13. The method according to claim 1, wherein the substituting comprises selecting multiple units of content with the second PID while discarding units of content with the first PID.

14. The method according to claim 1, wherein the substituting comprises selecting multiple units of content with a second PID while receiving units of content with the first PID.

15. The method according to claim 1, wherein the substituting comprises switching from a mode of selecting multiple units of content with the second PID while discarding units of content with the first PID to a mode of selecting multiple units of content with the second PID while receiving content with the first PID.

16. The method according to claim 1, wherein the substituting comprises switching from a mode of selecting multiple units of content with the second PID and receiving multiple units of content with the first PID to a mode of selecting multiple units of content with the second PID while discarding units of content with the first PID.

17. The method according to claim 1, wherein a unit of content with the second PID is sent before a corresponding unit of content with the first PID.

18. The method according to claim 1, wherein a unit of content with the second PID is sent after a corresponding unit of content with the first PID.

19. The method according to claim 1, wherein substitution is initiated and terminated by private signaling forming part of an adaptation layer of packets in a data stream.

20. The method according to claim 19, wherein the adaptation layer is in a packet with the second PID.

21. The method according to claim 19, wherein the adaptation layer is in a packet with the first PID.

22. The method according to claim 19, wherein the adaptation layer is in a packet that is neither the second nor the first PID.

23. The method according to claim 1, wherein the processing comprises playing back the content.

24. A non-transitory computer readable medium storing instructions which, when executed on a programmed processor, carry out the content substitution method according to claim 1.

25. A content multiplexer which creates an ordered stream of packets with primary and substitute content, comprising:
means for receiving input data representing main content;
means for receiving input data representing substitution content, such substitution content being for replacement of at least a portion of the main content;
a packet identifier (PID) mapper that assigns a primary PID to the main content and assigns a secondary PID to the substitution content; and
means for multiplexing an even or odd number of packets with the secondary PID ahead of packets with the primary PID, where the primary packets are either ignored or processed by a receiving device depending upon whether the number of packets is even or odd.

26. The content multiplexer according to claim 25, implemented using a programmed computer.

27. A content multiplexer which creates an ordered stream of packets with primary and substitute content, comprising:
- a processor that receives input data representing main content;
- the processor further receiving input data representing substitution content, such substitution content being for replacement of at least a portion of the main content;
- a packet identifier (PID) mapper that assigns a primary PID to the main content and assigns a secondary PID to the substitution content; and
- a multiplexer that multiplexes an even or odd number of packets with the secondary PID ahead of packets with the primary PID, where the primary packets are either ignored or processed by a receiving device depending upon whether the number of packets is even or odd.

* * * * *